US009106650B2

(12) United States Patent
Roesner et al.

(10) Patent No.: US 9,106,650 B2
(45) Date of Patent: Aug. 11, 2015

(54) USER-DRIVEN ACCESS CONTROL

(75) Inventors: Franziska Roesner, Seattle, WA (US);
Tadayoshi Kohno, Seattle, WA (US);
Alexander Moshchuk, Kirkland, WA (US); Bryan J. Parno, Seattle, WA (US);
Helen J. Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 13/292,090

(22) Filed: Nov. 9, 2011

(65) Prior Publication Data
US 2013/0117840 A1 May 9, 2013

(51) Int. Cl.
*G06F 7/04* (2006.01)
*H04L 29/06* (2006.01)
*G06F 21/62* (2013.01)

(52) U.S. Cl.
CPC .......... *H04L 63/10* (2013.01); *G06F 21/6281* (2013.01); *H04L 63/107* (2013.01); *G06F 2221/2111* (2013.01); *G06F 2221/2141* (2013.01)

(58) Field of Classification Search
CPC ............... G06F 2221/2111; G06F 2221/2141; G06F 3/048
See application file for complete search history.

(56) References Cited

U.S. PATENT DOCUMENTS

| 7,020,882 | B1 | 3/2006 | Lewallen |
| 7,577,995 | B2 | 8/2009 | Chebolu et al. |
| 8,166,452 | B2 | 4/2012 | Kinnucan et al. |
| 8,763,080 | B2 | 6/2014 | Carrara et al. |
| 2003/0145146 | A1* | 7/2003 | Posner et al. ................. 710/200 |
| 2006/0141985 | A1 | 6/2006 | Patel et al. |
| 2007/0006136 | A1* | 1/2007 | Hirschberg et al. ........... 717/105 |
| 2007/0165799 | A1 | 7/2007 | Juncker |
| 2007/0300185 | A1 | 12/2007 | Macbeth et al. |
| 2008/0120596 | A1 | 5/2008 | Kothari et al. |
| 2008/0126958 | A1* | 5/2008 | Louie ............................ 715/764 |
| 2008/0170776 | A1 | 7/2008 | Albertson et al. |

(Continued)

OTHER PUBLICATIONS

Wang, et al., "Protection and Communication Abstractions for Web Browsers in MashupOS," retrieved at <<http://research.microsoft.com/en-us/um/people/helenw/papers/sosp07MashupOS.pdf>>, Proceedings of the Twenty-first ACM SIGOPS Symposium on Operating Systems Principles (SOSP), 2007, 5 pages.

(Continued)

*Primary Examiner* — Nirav B Patel
*Assistant Examiner* — Mohammed Waliullah
(74) *Attorney, Agent, or Firm* — Judy Yee; Gregg Wisdom; Micky Minhas

(57) ABSTRACT

An access system is described herein which allows an application module to access a user-owned resource based on an indication of a user's intent to interact with the user-owned resource. For example, the application module can provide an application user interface which embeds a gadget associated with a particular user-owned resource. The access system can interpret the user's interaction with the gadget as conferring implicit permission to the application module to access the user-owned resource associated with the gadget. In addition, or alternatively, the user may make a telltale gesture in the course of interacting with the application module. The access system can interpret this gesture as conferring implicit permission to the application module to access a user-owned resource that is associated with the gesture.

20 Claims, 18 Drawing Sheets

(56) References Cited

U.S. PATENT DOCUMENTS

| | | | |
|---|---|---|---|
| 2008/0235811 A1 | 9/2008 | Yan | |
| 2009/0222925 A1 | 9/2009 | Hilaiel et al. | |
| 2009/0265760 A1 | 10/2009 | Zhu et al. | |
| 2010/0037304 A1 | 2/2010 | Canning et al. | |
| 2010/0313196 A1* | 12/2010 | De Atley et al. | 717/174 |
| 2011/0055892 A1 | 3/2011 | Wang et al. | |
| 2011/0138174 A1 | 6/2011 | Aciicmez et al. | |
| 2011/0161409 A1 | 6/2011 | Nair et al. | |
| 2011/0306426 A1 | 12/2011 | Novak et al. | |
| 2012/0036334 A1* | 2/2012 | Horman et al. | 711/165 |
| 2012/0089678 A1* | 4/2012 | Cort et al. | 709/204 |
| 2012/0117196 A1* | 5/2012 | Candelaria et al. | 709/219 |
| 2012/0144202 A1 | 6/2012 | Counterman | |
| 2012/0209923 A1 | 8/2012 | Mathur et al. | |
| 2012/0311438 A1* | 12/2012 | Cranfill et al. | 715/256 |
| 2013/0030922 A1* | 1/2013 | Shalabi et al. | 705/14.66 |
| 2013/0097203 A1 | 4/2013 | Bhattacharjee et al. | |
| 2013/0159169 A1 | 6/2013 | Schneeman et al. | |
| 2013/0166726 A1 | 6/2013 | Boldyrev et al. | |
| 2013/0191898 A1 | 7/2013 | Kraft | |

OTHER PUBLICATIONS

Wang, et al., "Convergence of Desktop and Web Applications on a Multi-Service OS," retrieved at <<http://research.microsoft.com/en-us/um/people/helenw/papers/serviceOSHotSec09.pdf>>, Proceedings of the 4th USENIX Conference on Hot Topics in Security (HotSec), 2009, 6 pages.

Meketa, Deneb, "Security changes in Flash Player 7," retrieved at <<http://www.adobe.com/devnet/flash/articles/fplayer_security.html>>, Adobe Systems Inc., San Jose, CA, Sep. 9, 2003, 15 pages.

Roesner, et al., "User-Driven Access Control: Rethinking Permission Granting in Modern Operating Systems," retrieved at <<http://research.microsoft.com/pubs/152495/user-driven-access-control.pdf>>, Technical Report No. MSR-TR-2011-91, Microsoft Research, Redmond, WA, Aug. 2011, 21 pages.

Melven, Ian, "User-initiated action requirements in Flash Player 10," retrieved at http://www.adobe.com/devnet/flashplayer/articles/fplayer10_uia_requirements.html>>, Adobe Systems Incorporated, Mountain View, CA, Oct. 2008, 3 pages.

"Android (operating system)," retrieved at <<http://en.wikipedia.org/wiki/Android_(operating_system)>>, retrieved on Jan. 20, 2012, Wikipedia encyclopedia entry, 13 pages.

"iPhone," retrieved at <<http://en.wikipedia.org/wiki/IPhone>>, retrieved on Jan. 20, 2012, Wikipedia encyclopedia entry, 16 pages.

Ballano, Mario, "Android Threats Getting Steamy," accessed at <<http://www.symantec.com/connect/blogs/android-threats-getting-steamy>>, Symantec Official Blog, Feb. 2011, Symantec Corporation, Sunnyvale, CA, 3 pages.

Barth, et al., "Protecting Browsers from Extension Vulnerabilities," accessed at <<http://www.adambarth.com/papers/2010/barth-felt-saxena-boodman.pdf>>, Network and Distributed System Security Symposium, Feb. 2010, 12 pages.

"Chromium: An open-source browser project to help move the web forward," accessed at <<https://code.google.com/p/chromium/issues/list?q=label:Security>>, accessed on Jan. 20, 2010, Security Issues, 3 pages.

Cox, et al., "A Safety-Oriented Platform for Web Applications," retrieved at <<http://www.cs.washington.edu/homes/gribble/papers/gribble-Tahoma.pdf>>, IEEE Symposium on Security and Privacy, 2006, 15 pages.

Ditto Clipboard Manager, retrieved at <<http://ditto-cp.sourceforge.net/>>, accessed on Jan. 20, 2012, 4 pages.

Dowdell, John, "Clipboard pollution," accessed at <<http://blogs.adobe.com/jd/2008/08/clipboard_pollution.html>>, Aug. 2008, Adobe Systems Incorporated, Mountain View, CA, 2 pages.

"Apps on Facebook.com," retrieved at <<http://developers.facebook.com/docs/guides/canvas/>>, Facebook, Inc., Menlo Park, CA, 5 pages.

Felt, et al., "The Effectiveness of Application Permissions," accessed at http://www.usenix.org/event/webapps11/tech/final_files/Felt.pdf>>, Proceedings of the 2nd USENIX Conference on Web Application Development, Jun. 2011, 12 pages.

Feske, et al., "A Nitpicker's Guide to a Minimal-complexity Secure GUI," accessed at <<http://www.acsa-admin.org/2005/papers/54.pdf>>, Proceedings of the 21st Annual Computer Security Applications Conference, 2005, 10 pages.

Grier, et al., "Secure Web Browsing with the OP Web Browser," accessed at <<http://www.cs.uiuc.edu/homes/kingst/Research_files/grier08.pdf>>, Proceedings of the 2008 IEEE Symposium on Security and Privacy, 2008, 15 pages.

Harris, Jensen, "No Distaste for Paste (Why the UI, Part 7)," accessed at <<http://blogs.msdn.com/b/jensenh/archive/2006/04/07/570798.aspx>>, Jensen Harris: An Office User Interface Blog, MSDN Blogs, Apr. 2006, 6 pages.

Howell, et al., "What You See Is What They Get: Protecting Users from Unwanted Use of Microphones, Camera, and Other Sensors," accessed at <<http://research.microsoft.com/pubs/131132/devices-camera-ready.pdf>>, Web 2.0 Security and Privacy Workshop, 2010, 9 pages.

Karger, et al., "A Retrospective on the VAX VMM Security Kernel," accessed at <<http://www.cse.psu.edu/~tjaeger/cse543-f06/papers/vax_vmm.pdf>>, IEEE Transactions on Software Engineering, vol. 17, No. 11, Nov. 1991, pp. 1147-1165.

Krohn, et al., "Information Flow Control for Standard OS Abstractions," accessed at <<http://acm.org>>, Proceedings of Twenty-first ACM SIGOPS Symposium on Operating Systems principles, 2007, pp. 321-334.

Mackenzie, I. S., "Fitts' Law as a Research and Design Tool in Human-Computer Interaction," retrieved at <<http://acm.org>>, Human-Computer Interaction (HCI), vol. 7, No. 1, 1992, pp. 91-139.

"How to Prevent Web Sites From Obtaining Access to the Contents of Your Windows Clipboard," retrieved at <<http://support.microsoft.com/kb/224993>>, Microsoft Corporation, Redmond, WA, Mar. 2007, 2 pages.

Silverlight Clipboard Class, accessed at <<http://msdn.microsoft.com/en-us/library/system.windows.clipboard (v=VS.95).aspx>>, Microsoft Corporation, Redmond, WA, 2010, 3 pages.

"What is User Account Control?," accessed at <<http://windows.microsoft.com/en-US/windows-vista/What-is-User-Account-Control, accessed on Jan. 20, 2012, Microsoft Corporation, Redmond, WA, 2 pages.

Microsoft User Research, information home pages, retrieved at <<http://www.microsoft.com/userresearch/default.mspx>>, accessed on Jan. 20, 2012, Microsoft Corporation, Redmond, WA, 1 page.

Miller, M. S., "Robust Composition: Towards a Unified Approach to Access Control and Concurrency Control," accessed at <<http://www.erights.org/talks/thesis/markm-thesis.pdf>>, PhD thesis, Johns Hopkins University, Baltimore, MD, 2006, 229 pages.

Motiee, et al., "Do Windows Users Follow the Principle of Least Privilege?: Investigating User Account Control Practices," accessed at <<http://acm.org>>, Proceedings of the Sixth Symposium on Usable Privacy and Security, 2010, pp. 1-13.

"Known Vulnerabilities in Mozilla Products," home page, retrieved at <<http://www.mozilla.org/security/known-vulnerabilities/>>, accessed on Jan. 20, 2012, Mozilla Foundation, 3 pages.

Novak, Brook, "Accessing the System Clipboard with JavaScript: A Holy Grail?," retrieved at <<http://brooknovak.wordpress.com/2009/07/28/accessing-the-system-clipboard-with-javascript/>>, Novak in Academia, Jul. 2009, 14 pages.

Hammer-Lahav, E., "The OAuth 1.0 Protocol," retrieved at <<http://tools.ietf.org/html/rfc5849>>, Internet Engineering Task Force (IETF), Request for Comments 5849, Apr. 2010, 39 pages.

Petroni, et al., "Automated Detection of Persistent Kernel Control-flow Attacks," retrieved at <<http://acm.org>>, Proceedings of the 14th ACM Conference on Computer and Communications Security, 2007, pp. 103-115.

Porter, et al., "Rethinking the Library OS from the Top Down," retrieved at <<http://acm.org>>, Proceedings of the Sixteenth International Conference on Architectural Support for Programming Languages and Operating Systems, Mar. 2011, pp. 291-304.

(56) References Cited

OTHER PUBLICATIONS

Reeder, et al., "A User Study of the Expandable Grid Applied to P3P Privacy Policy Visualization," retrieved at <<http://acm.org>>, Proceedings of the 7th ACM Workshop on Privacy in the Electronic Society, 2008, pp. 45-54.

Reis, et al., "Isolating Web Programs in Modern Browser Architectures," retrieved at <<http://acm.org>>, Proceedings of the 4th ACM European Conference on Computer Systems, 2009, pp. 219-232.

Roesner, Franziska, "User-Driven Access Control: A New Model for Granting Permissions in Modern Operating Systems," retrieved at <<http://www.franziroesner.com/pdf/quals-udac.pdf>> University of Washington, Seattle, Washington, Apr. 2011, 21 pages.

Ruderman, Jesse, "Same origin policy for JavaScript," retrieved at <<https://developer.mozilla.org/En/Same_origin_policy_for_JavaScript>>, Mozilla Developer Network, Nov. 3, 2011, 3 pages.

Qubes Architecture home page, retrieved at <<http://qubes-os.org/Architecture.html>>, retrieved on Jan. 20, 2012, Invisible Things Lab, Warsaw, Poland, 2 pages.

Rutkowska, et al., "Qubes OS Architecture," retrieved at << http://qubes-os.org/files/doc/arch-spec-0.3.pdf>>, Version 0.3, Invisible Things Lab, Warsaw, Poland, Jan. 2010, 44 pages.

Seshadri, et al., "SecVisor: A Tiny Hypervisor to Provide Lifetime Kernel Code Integrity for Commodity OSes," retrieved in <<http://acm.org>>, Proceedings of Twenty-first ACM SIGOPS symposium on Operating systems Principles, 2007, pp. 335-350.

Shapiro, et al., "Design of the EROS Trusted Window System," retrieved at <<http://www.usenix.org/events/sec04/tech/full_papers/shapiro/shapiro.pdf>>, Proceedings of the 13th USENIX Security Symposium, 2004, 15 pages.

Stiegler, et al., "POLARIS: Virus-Safe Computing for Windows XP," retrieved at <<http://acm.org>>, Communications of the ACM, vol. 49, No. 9, Sep. 2006, pp. 83-88.

Stolee, et al., "Revealing the Copy and Paste Habits of End Users," retrieved at <<http://cse.unl.edu/~grother/papers/vlhcc09.pdf>>, Proceedings of the 2009 IEEE Symposium on Visual Languages and Human-Centric Computing, 2009, 8 pages.

Tang, et al., "Trust and Protection in the Illinois Browser Operating System," retrieved at <<http://www.cs.uiuc.edu/homes/kingst/Research_files/tang10_1.pdf>>, Proceedings of the 9th USENIX Conference on Operating systems Design and Implementation, 2010, 15 pages.

Device APIs Working Group, retrieved at <<http://www.w3.org/2009/dap/>>, retrieved on Jan. 20, 2012, World Wide Web Consortium (W3C), 6 pages.

File API, retrieved at <<http://www.w3.org/TR/FileAPI/>>, Working Draft, World Wide Web Consortium (W3C), Oct. 20, 2011, 44 pages.

Hickson, Ian, "The vision behind the <device> element and the ConnectionPeer interface," retrieved at < http://lists.whatwg.org/htdig.cgi/whatwg-whatwg.org/2010-July/027129.html>>, Web Hypertext Application Technology Working Group (WHATWG), Jul. 13, 2010, 3 pages.

Wang, et al., "The Multi-Principal OS, Construction of the Gazelle Web Browser," accessed at <<http://research.microsoft.com/pubs/79655/gazelle.pdf>>, Proceedings of the 18th Conference on USENIX Security Symposium, 2009, 20 pages.

Wang, et al., "Convergence of Desktop and Web Applications on a Multi-Service OS," accessed at <<http://www.usenix.org/event/hotsec09/tech/full_papers/wang.pdf>>, Proceedings of the 4th USENIX Conference on Hot Topics in Security, 2009, 6 pages.

Xiong, Xi, et al., "Practical Protection of Kernel Integrity for Commodity OS from Untrusted Extensions," accessed at <<http://www.isoc.org/isoc/conferences/ndss/11/pdf/3_1.pdf, 18th Annual Network & Distributed System Security Symposium, Feb. 2011, 17 pages.

Yee, Ka-Ping, "Aligning Security and Usability," accessed at <<http://citeseerx.ist.psu.edu/viewdoc/download? doi=10.1.1.70.6097&rep=rep1&type=pdf>>, IEEE Security and Privacy, vol. 2, No. 5, Sep. 2004, pp. 48-55.

Zeldovich, et al., "Making Information Flow Explicit in HiStar," accessed at <<http://people.csail.mit.edu/nickolai/papers/zeldovich-histar.pdf>>, Proceedings of the 7th USENIX Symposium on Operating Systems Design and Implementation, vol. 7, 2006, 16 pages.

"Dropbox service," retrieved at <<http://en.wikipedia.org/wiki/Dropbox_(service)>>, retrieved on Jan. 20, 2012, Wikipedia encyclopedia entry, 11 pages.

Security-Enhanced Linux, project home page, retrieved at <<http://www.nsa.gov/research/selinux/>>, National Security Agency Central Security Service, Jan. 2009, 2 pages.

"Security-Enhanced Linux," retrieved at <<http://en.wikipedia.org/wiki/Security-Enhanced_Linux, retrieved on Jan. 20, 2012, Wikipedia encyclopedia entry, 7 pages.

Jackson, et al., "Subspace: Secure Cross-Domain Communication for Web Mashups," retrieved at <<http://www.collingjackson.com/research/papers/fp801-jackson.pdf>>, Proceedings of 16th International Conference on World Wide Web, WWW-07, May 2007, 10 pages.

"Surface new information insights with IBM Mashup Center V3.0," retrieved at <<http://www-01.ibm.com/common/ssi/rep_ca/3/897/ENUS210-403/ENUS2010-403.PDF>>, IBM United States Software Announcment 210-403, Nov. 16, 2010, pp. 1-16.

Li, et al., "Mash-IF: Practical Information-flow Control within Client-side Mashups," retrieved at <<http://ieeexplore.ieee.org/stamp/stamp.jsp?tp=&arnumber=5544312>>, Proceedings of the IEEE/IFIP International Conference on Dependable System and Networks (DSN), 2010, pp. 251-260.

Meyerovich, et al., "Secure Cooperative Sharing of JavaScript, Browser, and Physical Resources," retrieved at <<http://research.microsoft.com/en-us/um/people/livshits/papers/pdf/w2sp10b.pdf>>, Proceedings of the Workshop on Web 2.0 Security and Privacy, May 2010, 5 pages.

Roesner, et al., "Providing Intent-Based Access to User-Owned Resources," U.S. Appl. No. 13/292,090, filed on Feb. 8, 2012, 80 pages.

Roesner, et al., "User-Driven Access Control: Rethinking Permission Granting in Modern Operating Systems," retrieved at <<http://research.microsoft.com/apps/pubs/default.aspx?id=152495>>, Microsoft Research Technical Report No. MSR-TR-2011-91, Microsoft Corporation, Redmond, WA, Dec. 1, 2011, 16 pages.

Office Action mailed Apr. 8, 2015 for Roesner et al., "Providing Intent-Based Access to User-Owned Resources," U.S. Appl. No. 13/368,334, filed Feb. 8, 2012, 35 pages.

* cited by examiner

ANY LOCAL/REMOTE DISTRIBUTION OF SYSTEM COMPONENTS AND/OR DATA

USER-DRIVEN ACCESS CONTROL

BACKGROUND

Different strategies exist for enabling an application module to interact with a user-owned resource. As used herein, a user-owned resource refers to any functionality, control setting, or data associated with a user who interacts with a user device. For example, one type of user-owned resource may correspond to a camera resource that is provided by the user device. Another type of user-owned resource may correspond to data items (such as a documents, images, audio files, etc.) associated with a particular application module.

On one extreme of the design spectrum, an access strategy may treat all user-owned resources as global resources. This permits any application module that is installed on the user device to access any user-owned resource without restriction. A traditional desktop environment that runs on a personal computer uses this type of an access strategy. For instance, an application module that runs using the desktop system can generally access any of the resources provided by the personal computer by virtue of the fact that the user has permitted the application module to be installed on the personal computer. On the opposite extreme of the design spectrum, an access strategy may treat each application module as an isolated principal that has no access to any user-owned resource under any circumstance. Some types of traditional browser systems use this type of an access strategy or a variation of this type of access strategy. For instance, a web application module that runs using this type of browsing system is generally not allowed to access the user-owned resources installed on the computer device which runs the browsing system.

The first-mentioned access strategy is not optimal because an application module may represent a malicious entity which can access and utilize the user's resources in undesirable ways. The second access strategy is not optimal because an application module may have a legitimate need to access a user-owned resource. Preventing the application module from accessing a resource in this circumstance therefore reduces the utility of the application module, or may force the application module to rely on less efficient work-around solutions to access the user-owned resource. For example, a browser system may rely on a browser add-on to interact with a user-owned resource. But many browser add-ons enjoy overly broad access rights with respect to certain user-owned resources, and thereby may subject the user to undue security risks.

To address the above shortcomings, the industry has proposed various intermediate access strategies. In one case, an access strategy may treat the application modules as isolated entities. When an application requires access to a user-owned resource, the access strategy can display a prompt to the user, asking the user for permission to access to the user-owned resource. This strategy is not optimal, however, because the user may perceive the prompts as bothersome. In another case, an access strategy may provide a manifest which describes the access rights conferred to an application module. Upon installing an application module, the access strategy may ask the user to accept or decline the permission rights described in the manifest. This access strategy, however, is also not optimal because a user may not readily understand the nature of the rights described in the manifest. Further, the manifest may grant the application module overly broad access rights.

The above-noted potential shortcomings are set forth by way of illustration, not limitation. Known access strategies may suffer from additional potential drawbacks.

SUMMARY

An access system is described herein which detects when a user has interacted with an application module in a manner that is indicative of the user's intent to access a user-owned resource. If such an action is detected, the access system grants the application module selective access to the user-owned resource. In other words, the access system treats the user's access-directed action as implicitly conveying sufficient permission for the application module to access the user-owned resource. In the absence of a user action conveying particular rights, the application module enjoys no privileges to access user-owned resources. Further, the access system can treat each application module as an isolated entity with respect to other application modules.

In one implementation, for example, the application module presents an application user interface on a display mechanism of a user device. A provider module presents a gadget within the application user interface in such a manner that the user perceives the gadget as an integral part of the application user interface. The provider module and the gadget are associated with a particular user-owned resource. In operation, the access system detects when the user has interacted with the gadget. When such interaction is detected, the access system grants the application module selective access to the user-owned resource that is associated with the gadget. For example, an application module may present an application user interface that includes a camera-related gadget. That gadget invites the user to take a picture using a camera resource provided by a user device (where the camera resource represents one type of user-owned resource). In response to the user's activation of the gadget, the access system can allow the application module to receive an image that is taken by the camera resource. Otherwise, the application module is granted no other rights to user-owned resources.

In another implementation, the access system can detect when the user makes a telltale gesture when interacting with the application module, e.g., using a keyboard device, mouse device, touch-sensitive input device, etc. In response to this detection, the access system grants the application module selective access to a user-owned resource that is associated with the particular gesture that has been detected. For example, assume that the gesture is associated with a copy operation. In response to detecting this particular gesture, the access system can transfer data from the application module to a clipboard resource.

According to one possible benefit, the access system allows application modules to access user-owned resources in a manner that is not unduly burdensome to users. At the same time, the access system confers access rights that are narrowly tailored, thereby not compromising the security of user-owned resources and other functionality associated with the access system.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
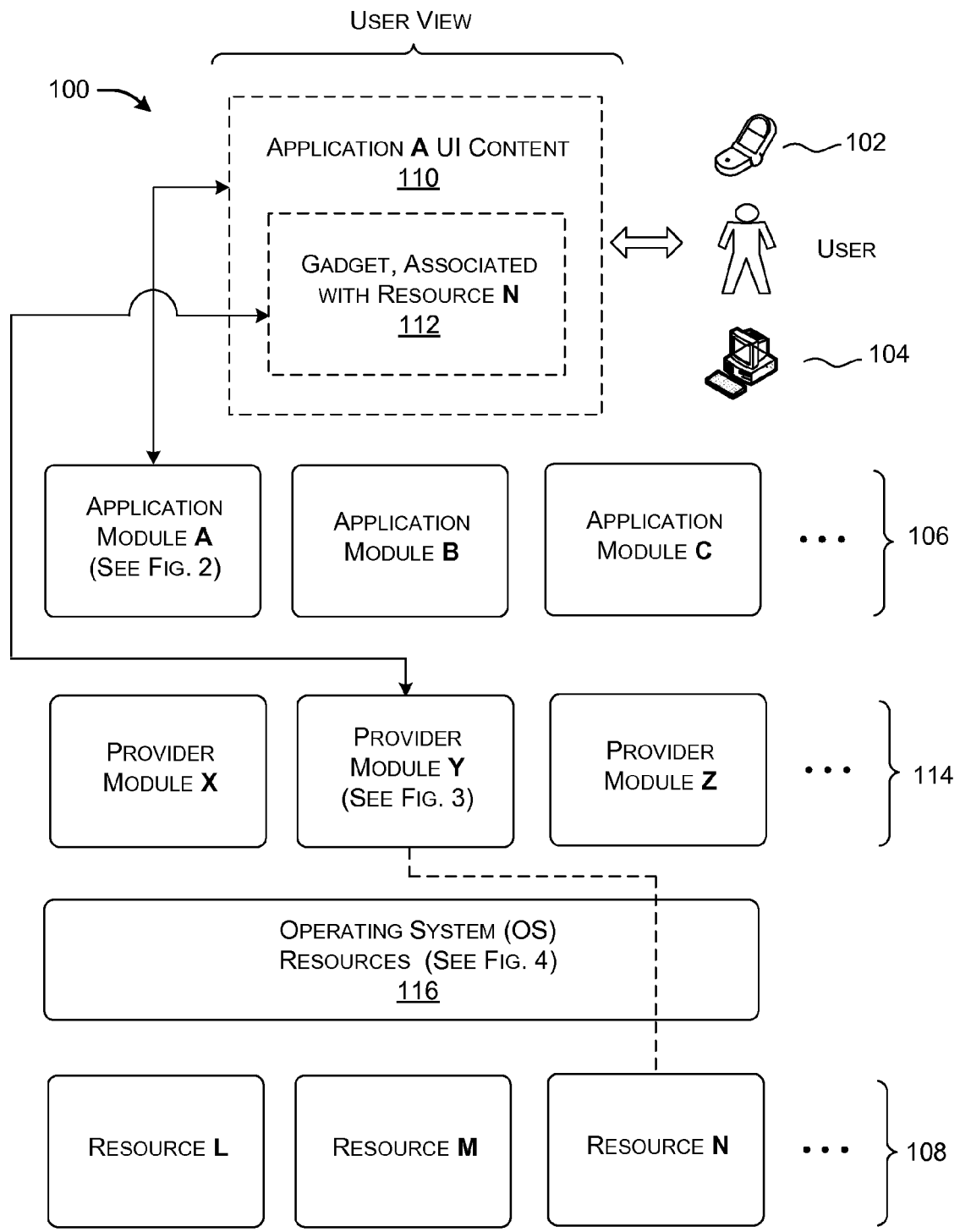
FIG. 1 shows an illustrative access system which allows application modules to selectively access user-owned resources.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative access system for allowing application modules to access user-owned resources based on user intent, as evidenced by the user's interaction with the application modules. Section B describes illustrative methods which explain the operation of the access system of Section A. Section C describes illustrative computing functionality that can be used to implement any aspect of the features described in Sections A and B.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG.

25, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Systems

Figure 5:
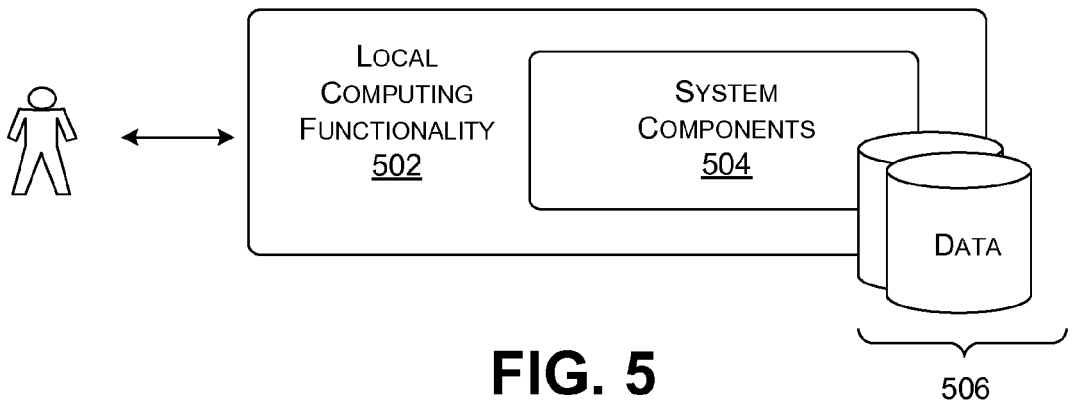
FIG. 5 shows a first implementation of the access system of FIG. 1, involving the use of only local computing functionality.
Figure 6:
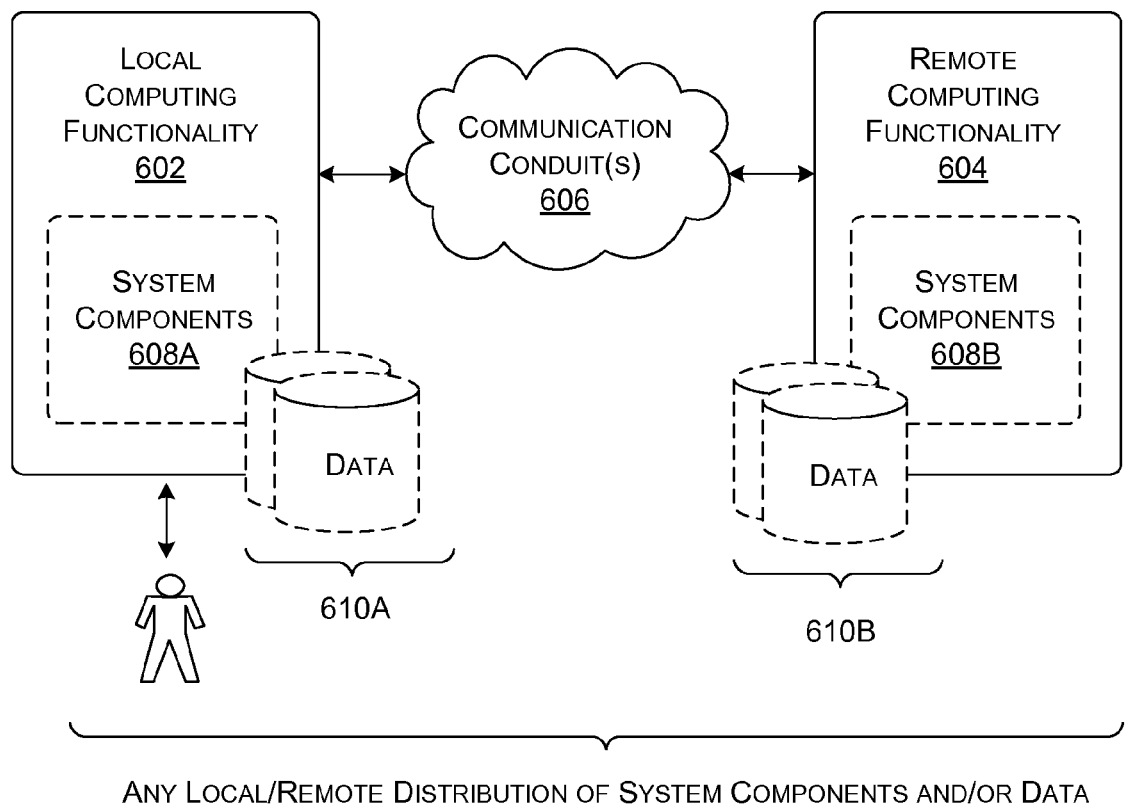
FIG. 6 shows a second implementation of the access system of FIG. 1, involving the use of remote computing functionality.

FIG. 1 shows an illustrative access system 100 which controls access to resources. In some implementations, a user may interact with the access system 100 via a user device. Further, in some implementations, at least parts of the access system 100 can be implemented by the user device. In one case, the user device may represent a portable computing device 102, such as a smart phone, a personal digital assistant device, an ebook reader device, a handheld game-playing device, a laptop computing device, and so on. In another case, the user device may represent a traditionally stationary computing device 104, such as a personal computer, a game console system, a set-top box, and so on. FIGS. 5 and 6, to be described below in turn, provide additional details regarding representative implementations of the access system 100.

The access system 100 allows application modules 106 to access user-owned resources 108. FIG. 1 shows three representative application modules (application module A, application module B, and application module C), and three representative user-owned resources (user-owned resource L, user-owned resource M, and user-owned resource N). However, the access system 100 can provide service to any number of application modules, and provide access to any number of user-owned resources. Although not shown in FIG. 1, each user-owned resource may include interface functionality that allows other components of the access system 100 to interact with it.

As used herein, an application module refers to any type of functionality for performing any function. In some cases, an application module can perform a high-level task. To name just a few possible high-level tasks, an application module can perform a word-processing function, an image editing function, a social networking function, any business-related function, and so on. In another case, an application module can perform a lower-level support task. To name just a few possible low-level tasks, an application module can perform a file management task, a communication-related task, and so on. An application module can be implemented in any manner. For example, in one case, an application module can represent a body of code that executes on any code runtime system. In another case, an application module can represent a body of markup language content and/or script content that executes on a browser system, and so on. The resources of an application module can be implemented locally and/or remotely with respect to the user device.

A user-owned resource represents any functionality or information that is associated with a particular user and controlled by that user. For example, some user-owned resources may pertain to physical equipment, such as a camera resource, a GPS resource, a speaker resource, a microphone resource, a printer resource, and so on. In other cases, the user-owned resources may pertain to software-implemented functionality (e.g., virtual equipment), such as a clipboard resource (for storing data in response to a copy or cut command), a transitory clipboard resource (for storing data in response to the commencement of a drag operation), a contact list resource, a preference store resource, a form autocomplete resource (for storing data to be automatically inserted into a form), and so on. This physical equipment and/or software-implemented functionality can be implemented by the user device which presents the application UIs and/or by any other entity (or entities) associated with the access system 100.

Other user-owned resources may pertain to data of any nature that is stored in any repository (or repositories). Those repository (or repositories) can be provided locally and/or remotely with respect to the user device which provides the application UIs. For example, without limitation, these user-owned resources can include image data, audio data, video data, document data, and so on, or any combination thereof. In some cases, this type of user-owned resource may be associated with a particular application module. For example, a social networking application module may store image data associated with a particular user; the image data constitutes a user-owned resource that is associated with the social networking application module.

Other user-owned resources may pertain to control settings or the like, stored at any location or combination of locations. Again, in some cases, this type of user-owned resource may be associated with a particular application module.

The above-described types of user-owned resources are mentioned by way of example, not limitation. Other environments can accommodate the inclusion of additional types of user-owned resources, and/or can omit one or more types of user-owned resources described above.

By way of overview, the access system 100 provides a security environment that is characterized by prescribed default behavior. In one implementation, for instance, the access system 100 isolates each application module from every other application module. The access system 100 can achieve isolation in various ways, including, but not limited to, process-based isolation, language-based isolation, virtual machine-implemented isolation, and so on. However, the access system 100 may permit application modules to communicate in a controlled manner, e.g., via inter-process communication (IPC) or the like. The access system 100 can define distinct application modules in any manner, such as by treating application modules which originate from different sources as distinct application modules. Further, the access system 100 does not, by default, allow any application module to access any user-owned resources. Examples of user-owned resources were described above (e.g., including physical equipment, software-implemented functionality, control settings, user data, and so on). The access system 100 does, however, permit an application module to access basic system resources, such as CPU resources, memory resources, communication resources, etc.

More specifically, the access system 100 does not outright preclude an application module from accessing a user-owned resource. Rather, the access system 100 allows the application module to access a user-owned resource based on a least-privileged paradigm of resource access. This means that the access system 100 allows an application module to access user-owned resources on a narrowly tailored and as-needed basis.

More specifically, the access system 100 performs selective granting of access privileges by examining the manner in which a user has interacted with an application module. If the user performs an action which is indicative of an intent to access a specific user-owned resource, the access system 100 will grant the application module access to the user-owned resource. In other words, the access system 100 treats the targeted action made by the user as conferring implicit permission to the application module to access the user-owned resource. The rights conferred by this permission have a limited scope. This means that the rights may allow the application module to perform a limited number of transactions (or a single transaction) with the affected user-owned resource. Alternatively, or in addition, the rights may allow the application module to receive access to the user-owned resource for a limited span of time, e.g., until the occurrence of a particular event (such as the close of a session). Further, the rights associated with an action apply to a single user-owned resource, rather than all of the resources associated with the user.

By virtue of the above-summarized manner of granting privileges, the access system 100 can offer a user-friendly interaction experience to a user. This is because the access system 100 need not burden the user with special-purpose prompts and permission-based dialogues that are extraneous to the user's interaction with an application module. Nevertheless, the access system 100 can also use such prompts and dialogues (and the like) as supplemental security provisions. That is, while the access system 100 does not require the use of such security provisions, it does not preclude the use of them. At the same time, the access system 100 protects the security of the user-owned resources and other features of the access system 100.

The access system 100 can gauge the user's access-related intent in at least two ways described below. In a first technique, the access system 100 determines the user's intent based on the manner in which the user interacts with a gadget which is embedded in an application user interface (UI) (provided by a corresponding application module). In a second technique, the access system 100 determines the user's intent based on whether the user has performed a telltale gesture using any input mechanism, while interacting with an application module.

First consider the use of gadgets. A gadget refers to a UI feature. The access system 100 presents the gadget on a display mechanism of the user device, such as on a display monitor of a personal computer or the touch screen of a smart phone. More specifically, the access system 100 presents the gadget in the context of an application UI provided by an application module. As such, a user perceives the gadget as forming an integral part of the application UI. The gadget itself has at least one user interface control mechanism that allows a user to interact with the gadget. The gadget also can have any size, shape, informational content, style, etc. For instance, a gadget may resemble a button, a panel, a menu, a slider mechanism, etc.

For example, consider the high-level depiction provided by FIG. 1. Here, the application module A presents an application UI 110 devoted to whatever service it provides. For example, suppose that the application module A corresponds to a shopping-related service. In this case, the application module A presents an application UI 110 that enables a user to search through an online catalogue of merchandise items. The access system 100 also presents at least one gadget 112 within the application UI 110. A user therefore perceives the gadget 112 as forming a part of the application UI 110—that is, as if provided by the application module A itself.

A user may interact with the gadget 112 to enable the application module A to access a particular user-owned resource that is associated with the gadget 112. In the representative case of FIG. 1, the gadget 112 is associated with the user-owned resource N. Hence, the user can interact with the gadget 112 to allow the application module A to receive data from the user-owned resource N, or to provide data to the user-owned resource N, or to change the status of the user-owned resource N, etc. (That is, the particular nature of the gadget determines the type of access action that is invoked by the gadget 112.) By default, however, the application module A has no privileges to access any user-owned resource, including the user-owned resource N.

More generally, the access system 100 uses a collection of provider modules 112 to provide and manage a plurality of gadgets that may be integrated into application UIs. That is, each provider module provides and manages a separate gadget (although, in some cases, a single provider module can provide and manage two or more related gadgets). Further, each provider module is associated with a single user-owned resource. For example, a provider module X may be associated with a particular user-owned resource L, a provider module Y may be associated with a particular user-owned resource M, a provider module Z may be associated with a particular user-owned resource N, and so on. Hence, in the example, of FIG. 1, the provider module Y is assigned the duty of providing and managing the gadget 112, which, as said, enables the application module A to access the user-owned resource N.

While a user may perceive the gadget 112 as forming an integral part of the application UI 110, two different entities within the access system 100 control the gadget 112 and the application UI 110. That is, the application module A controls the application UI 110, while the provider module Y controls the gadget 112. More specifically, assume that the gadget 112 corresponds to a panel or button that is presented within a larger window devoted to the application UI 110. The access system 100 isolates the application module A from any provider module that presents gadgets which are embedded in the application UI 110. This means that the application module A cannot control the pixels that are presented in the display space associated with the gadget 112; nor can the provider module control the pixels that are presented in the application UI 110. Further, as will be explained below in greater detail, the access system 100 can also isolate a provider module from content that is pasted into a gadget that is controlled by the provider module.

The provider modules 114 can be implemented in different ways. In one merely illustrative case, each provider module corresponds to a code module that runs on a layer between the application modules 106 and an operating system 116 of the user device. In one implementation, a managing entity (such as a software provider) may install the provider modules 114 at the same time that it provides the operating system 116. Further, the managing entity may update the provider modules 114 using the same processes that it uses to update the operating system 116. In some implementations, the user may query the access system 100 to discover what provider modules 114 have been installed in the access system 100.

In some implementations, the access system 100 may not allow the user to install new provider modules. Further, in some implementations, the access system 100 may not allow a provider module to interact with other entities over a network or via IPC access or the like. These restrictions may be useful to improve the security of the access system 100, but these restrictions can also be relaxed or removed in other implementations of the access system 100.

Consider next the use of gestures. A gesture refers to a telltale action performed by the user while interacting with an application module, using one or more input mechanisms. For example, a user can perform a telltale gesture by activating one or more keys on a keyboard, e.g., by pressing a single key or simultaneously pressing two or more keys. Alternatively, or in addition, the user can perform a telltale gesture by manipulating a mouse device in a prescribed manner, e.g., by performing a drag-and-drop operation. Alternatively, or in addition, the user can perform a telltale gesture by touching a touch-sensitive display device in a prescribed manner, and/or by moving a handheld user device in a prescribed manner. A handheld user device can detect movement of the device using any movement detection mechanism(s), such as an accelerometer, a gyro device, a magnetometer, etc.

The access system 100 associates each gesture with a particular access-related action that affects a particular user-owned resource. For example, the access system 100 can interpret a first gesture as a request to copy data from an application module into a clipboard resource. The access system 100 can interpret a second gesture as a request to copy data from the clipboard resource into the application module, and so on. In other words, the access system 100 interprets the telltale gesture as granting the application module implicit authorization to interact with a user-owned resource, such as the clipboard resource. Otherwise, as stated above, the application module does not have privileges to access any user-owned resources.

Note that the access system 100 can interpret each gesture in the same manner regardless of the particular application module that the user happens to be interacting with at the moment. Further, a user can perform any gesture in a set of possible gestures at any given time, regardless of the particular application module that the user happens to be interacting with at the moment. This is in contrast to the use of gadgets. That is, the user may interact with only those gadgets that are being displayed in the context of a particular application module that the user happens to be interacting with at the moment.

The access system 100 can employ yet other strategies for assessing the intent of the user to access user-owned resources (besides, or in addition to, the use of gadgets and gestures). In each case, the user performs some action while interacting with an application module that is specifically directed to a particular user-owned resource. The access system 100 interprets this action as granting the application module implicit permission to access the user-owned resource, where that permission is narrowly tailored in nature.

The access system 100 can carry out the functions described above in different ways. Generally, the access system 100 provides different functional "actors" that may perform different roles to accomplish an access-related transaction. These actors include at least one application module, at least one provider module, at least one user-owned resource, and the operating system 116 of the user device. The description which follows provides examples in which the access system 100 assigns particular roles to these particular actors when performing particular access-related transactions. However, these examples are set forth by way of illustration, not limitation; other implementations can allocate tasks to the actors in the access system in a different manner than is set forth in the detailed examples.

Figure 2:
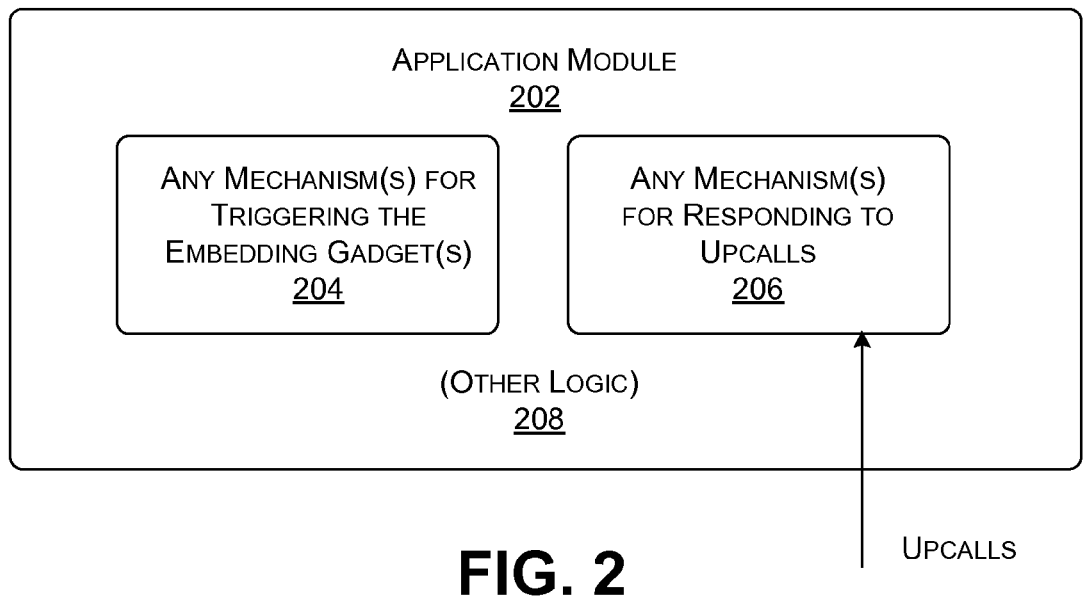
FIG. 2 shows an illustrative application module for use in the access system of FIG. 1.

FIG. 2 shows an application module 202 for use in the access system 100 of FIG. 1, such as the application module A. As noted above, the application module 202 can perform any high-level or low-level function, and can be implemented in any manner. The application module 202 can present an application UI (such as the application UI 110 of FIG. 1) by which a user may interact with the application module 202 in any manner.

The application module 202 can include functionality that enables it to interact with the various components of the access system 100 shown in FIG. 1. For example, the application module 202 can include any mechanism 204 for instructing the access system 100 to embed a gadget into its application UI. In one case, the application module 202 can implement the mechanism 204 using a code statement or a markup statement that triggers a runtime system to display a gadget during the setup of the application UI.

The mechanism 204 can specify various parameters which govern the presentation of the gadget within the application UI. A first parameter can specify the user-owned resource associated with the gadget. A second parameter can specify the type of gadget which is to be displayed (and, by implication, the type of function that will be invoked by activating the gadget). A third parameter can specify the location within the application UI at which the gadget is to be displayed. An optional fourth parameter can specify the duration of the access rights that will be conferred upon activation of the gadget. For example, a gadget can confer rights which apply to a single transaction, a single session, or multiple sessions. But as will be described in greater detail below, a user can also expressly revoke any type of extended permission granted to an application module.

For example, the mechanism 204 can be implemented using the statement EmbedACG ( ), where "ACG" is an abbreviation that represents "access control gadget." For instance, the statement EmbedACG ("clipboard", "copy", (x, y), "one-time") instructs the access system 100 to create a gadget that applies a clipboard resource ("clipboard") to perform a copy function ("copy"). The statement further instructs the access system 100 to embed the gadget at a screen location (x, y) within an application UI provided by the application module 202. The gadget functions by storing data into the clipboard resource, and the permission that is granted when the user activates this gadget extends to only a single ("one-time") transaction. The statement EmbedACG ("gps", "toggle", (x, y), "session") instructs the access system 100 to create a gadget that controls a GPS device ("gps") provided by a user device by performing a "toggle" function, that is, by turning the GPS device on and off in the context of a particular application module. The gadget is displayed at a location (x, y) with the application UI provided by the application module 202. Upon activation, the gadget changes the status of the GPS device, and that status remains in effect for an entire session ("session"). (A session ends when the user closes the application module.)

A mechanism 206 allows the application module 202 to respond to upcalls, where upcalls correspond to call messages sent from the operating system 116 (and/or some other entity). For example, as will be set forth below, the operating system 116 can instruct the application module 202 to supply user-owned data (in response to a pull upcall) or to receive user-owned data (in response to a push upcall). The mechanism 206 represents whatever logic that the application module 202 may use to properly respond to these upcall requests. Finally, the application module 202 can include any other logic 208 for performing any respective function(s) that may be particular to services performed by the application module 202.

Figure 3:
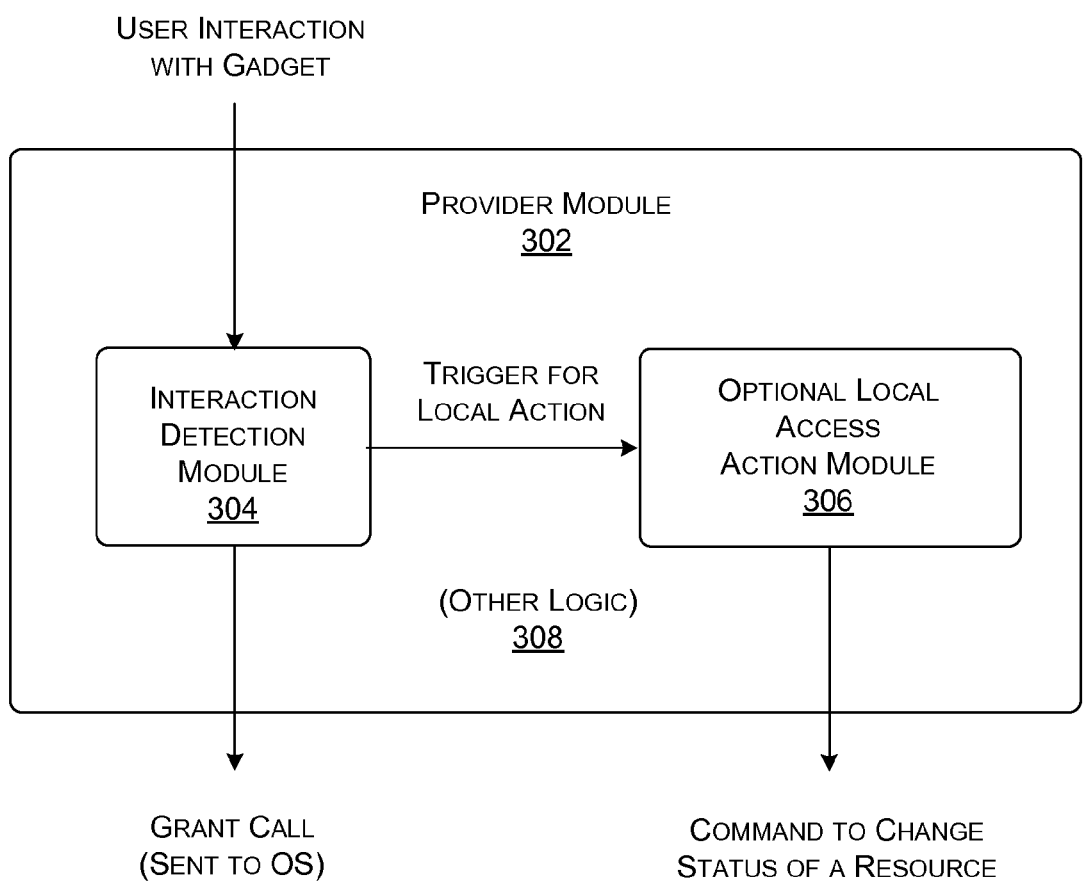
FIG. 3 shows an illustrative provider module for use in the access system of FIG. 1; in some implementations, the provider module plays a role in managing access to a particular user-owned resource.

FIG. 3 shows an illustrative provider module 302 for use in the access system 100 of FIG. 1. For example, the provider module 302 may pertain to the provider module Y shown in FIG. 1. As explained above, that provider module controls one or more gadgets that affect application module A's access to the user-owned resource N.

The provider module 302 can include functionality that enables it to interact with the various components of the access system 100 shown in FIG. 1. For example, the provider module 302 can include an interaction detection module 304 that determines when the user has interacted with a gadget, such as the gadget 112 shown in FIG. 1. The user can interact with the gadget by making an input action which affects the gadget, e.g., by touching a touch-sensitive input surface, using a mouse device, using a keyboard device, and so on. The input action may entail clicking a UI button, moving a control element, checking a UI box, entering information into an input region, and so on (or any combination of these input actions).

In response to detecting the user's interaction with the gadget, the interaction detection module 304 can perform different operations, depending on the nature of the operation that has been activated. In one case, assume that the operation to be performed does not involve the transfer of data to or from a user-owned resource. Rather, assume that the operation simply involves adjusting the status of the user-owned resource, such as muting or un-muting a speaker resource. The provider module 302 can use a local access action module 306 to directly carry out this transaction (where "local" means that the module is local to the provider module 302). That is, when activated by the interaction detection module 304, the local access action module 306 sends an appropriate command to the appropriate user-owned resource, e.g., to mute or un-mute the speaker resource.

In another case, assume that the operation invoked by the gadget involves the transfer of data. In this case, the interaction detection module 304 can send a grant call to the operating system 116. Upon receipt, the operating system 116 acts on the grant call by granting the application module access to the appropriate user-owned resource (in a manner to be set forth in greater detail below). A grant call sent by a provider module is only capable of affecting the user-owned resource that is associated with the provider module. Further, in one implementation, the operating system 116 will only response to grant calls issued by provider modules that are duly registered with the access system 100.

In one case, a grant call can specify various parameters which define the nature of the access being requested. One parameter can specify the source entity which supplies data or confers some other service. Another parameter can specify a destination entity which will receive the data or receives some other service. Another parameter specifies the type of access to be granted. Another parameter may specify the duration of the grant. Another parameter may specify a display region (e.g., a window region) which is instructed to respond to an upcall (e.g., in case in which the application module involves the presentation of multiple window regions).

For example, consider the representative grant call GrantAcess(cameraId, photoEditorId, "photo", "one-time"). This grant call requests the access system 100 to grant an application module that performs a photo editing service (identified by the name photoEditorId) the ability to receive an image produced by a camera resource (identified by the name cameraId), when the user activates a photo-taking gadget. That is, the camera resource is the source of the data and the photo editing service is the destination of the data. The access is one-time, meaning that the photo editing service gains access to the camera resource for a single transaction (corresponding to the capture of a single image). A grant call can also request that a user-owned resource (such as a printer resource) receive data supplied by a source entity (e.g., an application module).

In the examples set forth above, the provider module 302 sends a grant call to the operating system 116 when a gadget is activated that triggers the transfer of data to or from a user-owned resource. But in an alternative implementation, the provider module 302 can itself manage a grant request that involves the transfer of data, that is, without asking the operating system 116 to perform this task.

Finally, the provider module 302 can include any other logic 308 for performing any other respective function(s).

Figure 4:
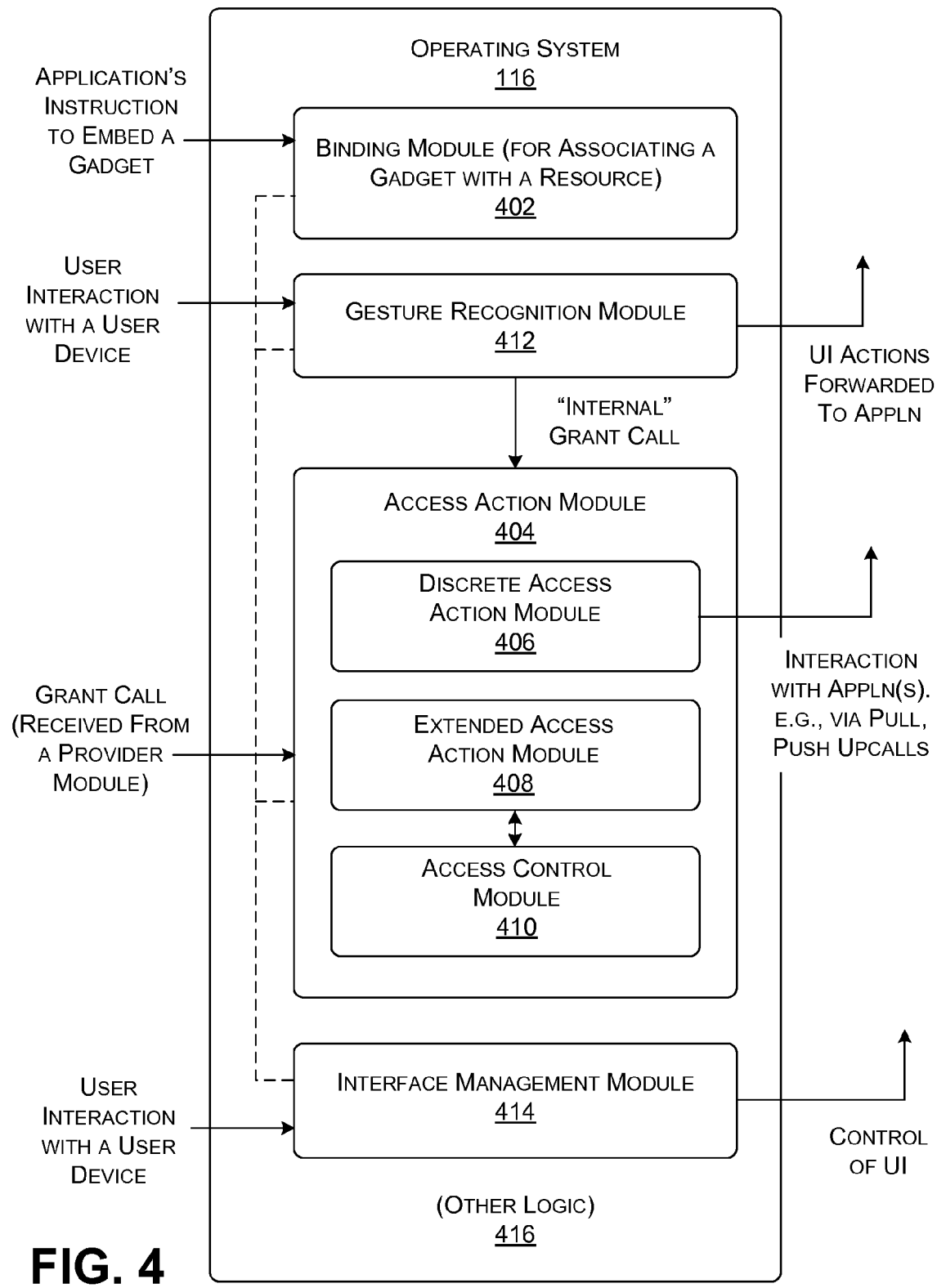
FIG. 4 shows an illustrative operating system for use in the access system of FIG. 1; in some implementations, logic within the operating system plays a role in managing access to particular user-owned resources.

FIG. 4 shows one implementation of the operating system 116 for use in the access system 100 of FIG. 1. Generally, the operating system 116 manages the input mechanisms and output mechanism of the user device. The operating system 116 also manages utilization of basic system resources (such as CPU resources, memory resources, bus resources, and communication), which can be considered non-user-owned resources. But to facilitate description, FIG. 4 emphasizes only those particular features of the operating system 116 that serve a role in allowing application modules 106 to access the user-owned resources 108. In one implementation, the various features shown in FIG. 4 can be implemented by kernel-level functionality provided by the operating system 116.

To begin with, the operating system 116 includes a binding module 402 which responds to an instruction, triggered by an application module, to embed a particular gadget within the application UI of the application module. The binding module 402 responds to this instruction by associating a particular provider module with the gadget. The provider module, in turn, is associated with a particular user-owned resource. Henceforth, the operating system 116 governs the UI space provided by the user device such that the application module controls the application UI, while the provider module controls the gadget. In other words, the user perceives the gadget as being an integral part of the application UI. But the gadget and the application UI originate from two separate isolated entities (i.e., the provider module and the application module, respectively).

An access action module 404 responds to a grant call sent by any provider module. The provider module, in turn, sends the grant call when a user interacts with the gadget associated with the provider module. The access action module 404 responds to a grant call by granting the application module access to the user-owned resource associated with the provider module.

Assume that the grant call seeks access to a user-owned resource to perform a single transaction, such as to take a single picture using a camera resource. The access action module 404 can use a discrete access action module 406 to handle this type of grant call. Alternatively, assume that the grant call seeks access to a user-owned resource for an extended period of time, such as for an entire session or longer. The access action module 404 can use an extended access action module 408 to address this type of grant call.

First consider a grant call which seeks extended access. The extended access action module 408 can respond to this type of grant call by changing a state entry maintained by an access control module 410. For instance, the access control module 410 may comprise an access control list which specifies, at any given time, the access rights possessed by each application module, with respect to each user-owned resource.

For example, assume that the user interacts with a gadget to enable an application module to receive pictures from a camera resource over an entire session. The extended access action module 408 can change an appropriate state entry in the access control module 410 to reflect that the desired permission has been granted. Henceforth, the application module is permitted to receive images from the camera resource.

The user can also interact with a provider module to revoke a previously-specified extended permission. This will prompt the access system 100 to generate a revoke call which revokes a prior-granted permission. The extended access action module 408 responds to this revoke call by changing an appropriate state entry in the access control module 410.

Next consider the case of a one-time access transaction. In response to this type of grant call, the discrete access action module 406 can send a pull upcall to a source entity to receive data associated with the transaction. The discrete access action module 406 can then send a push upcall to forward the received data to a destination entity. Either the source entity or the destination entity represents a user-owned resource that is managed by a corresponding provider module; that provider module, in turn, controls the gadget which is used to trigger the one-time access transaction.

The operating system 116 also includes a gesture recognition module 412. The gesture recognition module 412 monitors input actions made by a user using any input mechanism. If the gesture recognition module 412 determines that the user has performed a telltale gesture, it generates an internal grant call. The gesture recognition module 412 then forwards the grant call to the access action module 404. The grant call provided by the gesture recognition module 412 can include the same type of parameters described above (with respect to a grant call generated by a provider module).

For example, assume that the user has simultaneously pressed the Ctrl key and the C key of the keyboard, which the gesture recognition module 412 interprets as a request to copy data from an application module into a clipboard resource. In response, the gesture recognition module 412 can produce the grant call GrantAccess (inFocusApp, "clipboard", "put"). The grant call specifies that the in-focus application module is to supply data which will be placed into the clipboard resource. Next assume that the user has simultaneously pressed the Ctrl key and the V key of the keyboard, which the gesture recognition module 412 interprets as a request to copy data from the clipboard to an application module. In response, the gesture recognition module 412 can produce the grant call GrantAccess ("clipboard", inFocusApp, "get"). In another example, the user can simultaneously press the Ctrl key and the P key to send data provided by an application module to a printer resource. In another example, the user can press a PrtScn key to send a screenshot to the printer resource, and so on.

The access action module 404 can respond to the grant calls received from the gesture recognition module 412 in the same manner described above. That is, in some cases, the access action module 404 can perform a one-time granting of access, using the discrete access action module 406. In other cases, the access action module 404 can perform an extended granting of access, using the extended access action module 408.

The gesture recognition module 412 can also pass user input actions directly to the application module with which the user is interacting. This allows the application module to interpret the input actions using its own internal logic. For example, an application module can examine the input actions to determine whether they match any application-centric gestures; if so, the application module can invoke whatever operations are associated with those gestures. The gesture recognition module 412 can use any protocol to forward input events to the application module, such as the remote desktop protocol (RDP).

In certain cases, an application module can even redefine an action to be performed when a user performs a gesture that is recognized by the gesture recognition module 412. For example, assume that the gesture recognition module 412 interprets the simultaneous pressing of the Ctrl and C keys as a request to transfer data from the application module to a clipboard resource. An application module can respond to this gesture by performing some other application-centric function, effectively ignoring the fact that the access system 100 may have also stored data from the application module into the clipboard resource.

In certain cases, an application module can also perform application-centric functions which are related to the functions invoked by the gestures that are recognized by the gesture recognition module 412. For example, an application module can interpret an application-centric gesture (e.g., as produced by typing the characters "yy") as a request to copy data between sub-modules provided by the application module. This internal copy operation, however, does not entail storing the data in the clipboard resource unless the user also activates the application-agnostic gesture (e.g., by pressing Ctrl and C) which performs this function (and which will be recognized by the gesture recognition module 412).

Finally, the operating system 116 can include an interface management module 414 which implements various security-related safeguards. For example, the interface management module 414 can enforce a policy whereby a user is not permitted to interact with a gadget unless the gadget is fully visible (meaning that no object overlays any part of the gadget). For example, the interface management module 414 can display the gadget in a greyed-out mode of presentation if the gadget is at least partially obscured by another display object. This provision reduces the chances that a malicious entity may overlay information on top of a gadget with the intent of fooling the user into clicking on the gadget, when the user would not otherwise perform this action. The interface management module 414 can also allow a user to interact with a gadget only after it has been displayed for a minimum amount of time (e.g., 200 ms in one example).

As another safeguard, the interface management module 414 can enforce a policy whereby the user is only allowed to interact with a gadget via certain input mechanisms, such as the physical input mechanisms associated with the user device (e.g., the keyboard device, mouse device, touch-sensitive input device, etc.). As a related safeguard, the interface management module 414 can manage the visual feedback sent to a gadget, e.g., by ensuring that a cursor is displayed when the user hovers over a gadget. This provision can prevent, for example, a rogue application module from confusing the user as to where the user is clicking within a UI space.

Figure 22:
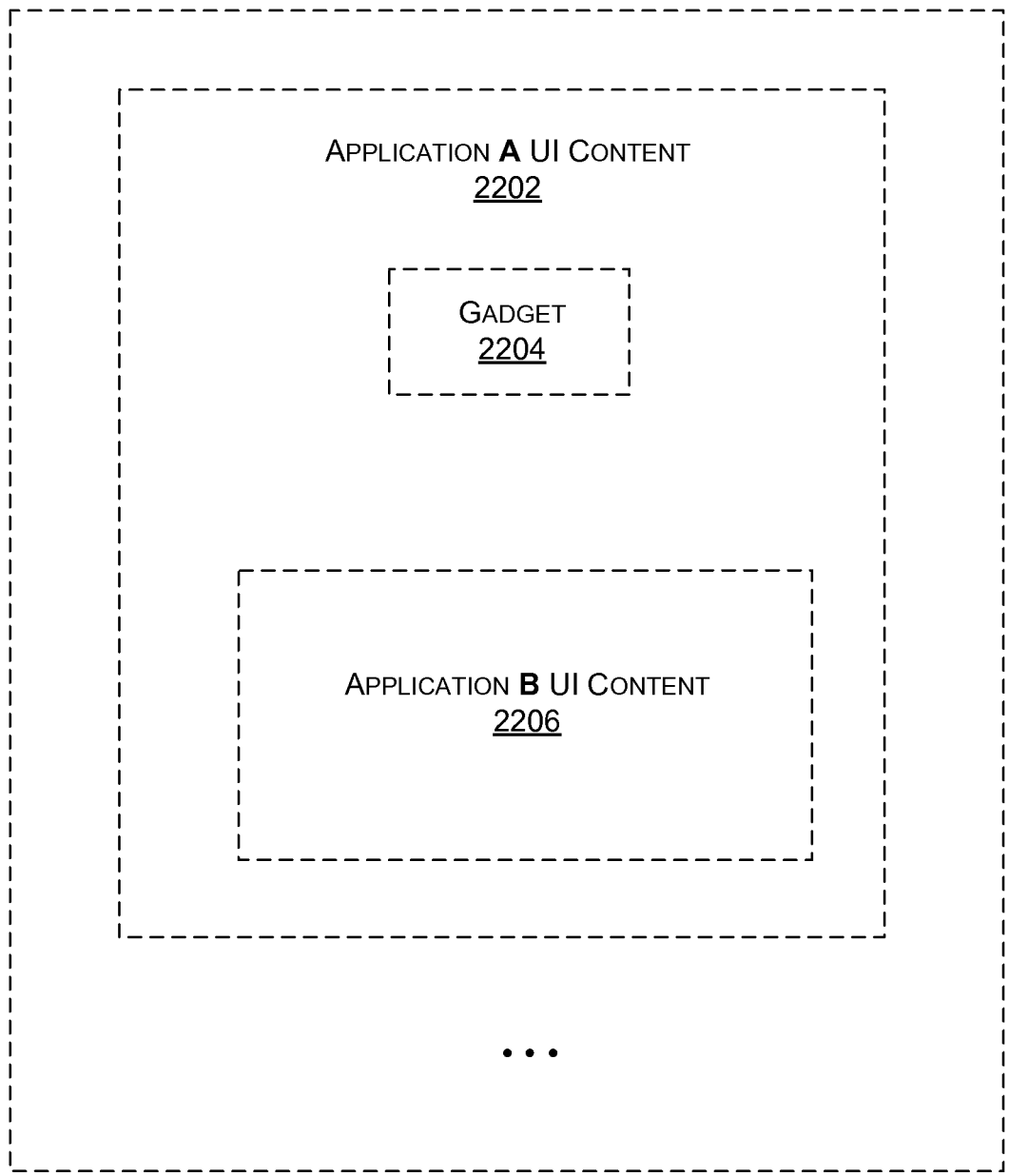
FIG. 22 shows an application UI that includes multiple parts controlled by different respective application modules. One or more parts may include gadgets embedded therein, controlled by respective provider modules.

As another feature, the interface management module 414 can manage the use of gadgets within nested UI regions. For example, an application module can present an application UI which incorporates, as part thereof, the application UI provided by another application module (e.g., as shown in FIG. 22). In one implementation, the interface management module 414 can enforce a restriction whereby, by default, only the top-level application UI is permitted to embed gadgets into its application UI. This provision prevents a nested application UI from tricking the user into thinking that an embedded gadget is actually associated with the top-level application UI, not the nested application UI. However, in one implementation, the top-level application module associated with the top-level application UI can choose to grant nested application modules the ability to locally embed gadgets in their respective application UIs.

The above-described restrictions pertain to one particular implementation, rather than outright prohibitions. That is, other implementations can remove or relax the above restrictions in any manner that is deemed appropriate for a particular environment.

The interface management module 414 can also host functionality which displays a control panel to the user, upon request from the user. The control panel displays the access rights granted (and not granted) to each application module at a particular point in time. The user may also interact with the control panel to revoke any prior-granted permission. More specifically, the user can revoke the access rights that have been granted to an application module even though, at the present time, the application module has been closed and is no longer running.

The operating system 116 also includes any other logic 416 for performing any other functions.

As a final note, any of the functions attributed to the operating system 116 can also (or alternatively) be performed by other components of the access system 100, such as the provider modules 114. Alternatively, or in addition, any of the above-described functions attributed to the provider modules 114 can instead be performed by the operating system 116 or other components of the access system 100.

FIG. 5 shows a stand-alone implementation of the access system 100 of FIG. 1. In this case, local computing functionality 502 includes system components 504 and data 506 which implement the various features of the access system 100 described above. In one implementation, the local computing functionality 502 can represent the portable computing device 102 or the stationary computing device 104 of FIG. 1.

FIG. 6 shows a distributed implementation of the access system 100 of FIG. 1. In this case, local computing functionality 602 is coupled to remote computing functionality 604 via a communication conduit 606. The local computing functionality 602 includes system components 608A and data 610A which implement some functions of the access system 100, while the remote computing functionality 604 includes system components 608B and data 610B which implements other functions of the access system 100.

To cite one example, the remote computing functionality 604 can implement any of the application modules 106, the provider modules 114, and the operating system 116. Together these components provide UI content for presentation to the user by the local computing functionality 602. Some of the user-owned resourced protected by the access system 100 may pertain to functionality and data provided by the local computing functionality 602 and/or the remote computing functionality 604. The term functionality encompasses physical equipment and software-implemented functionality.

The local computing functionality 602 can be implemented by the portable computing device 102 or the stationary computing device 104 shown in FIG. 1. The remote computing functionality 604 can be implemented by one or more server computers and associated data stores. The communication conduit 606 can be implemented by any combination of a local area network, a wide area network (e.g., the Internet), or a combination thereof B. Illustrative Processes FIGS. 7-24 show UI examples and procedures which describe the operation of the access system 100 of FIG. 1. Since the principles underlying the operation of the access system 100 have already been described in Section A, certain operations will be addressed in summary fashion in this section.

As a general prefatory note, the procedures of this section describe concrete actions that are performed by particular components within the access system 100 (e.g., application modules 106, provider modules 114, user-owned resources 108, and the operating system 116). However, this allocation pertains to only one representative implementation. Other implementations can assign different roles to different respective components, compared to the examples which follow. Further, other implementations can vary the ordering of operations performed by the components, compared to the examples which follow. Finally, to facilitate description, the procedures illustrated in the drawings may omit certain interactions and operations. For example, the operating system 116 plays some role in processing all input data and presenting all output data; but the procedures highlight only those functions performed by the operating system 116 which pertain to the access-related role it serves within the access system 100 of FIG. 1.

Figure 7:
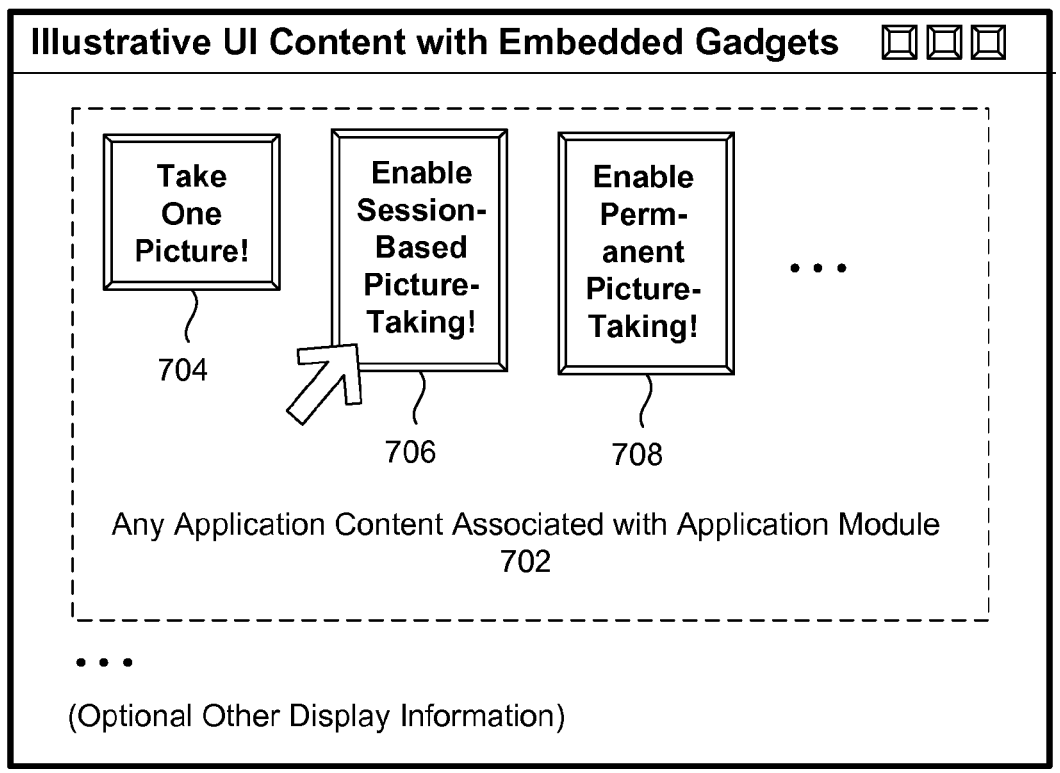
FIG. 7 shows an example of an application user interface (UI) that includes three gadgets embedded therein. These gadgets allow a corresponding application module to receive images from a camera resource.

Beginning with FIG. 7, this figure shows an application UI 702 presented by an application module. The application module performs any function (such as a photo editing function, in one example). A provider module which is associated with a camera resource displays three gadgets (704, 706, 708) within the application UI 702, giving the user the impression that the gadgets (704, 706, 708) are an integral part of the application UI 702. The first gadget 704 instructs the access system 100 to allow the application module to gain access to the camera resource to receive a single image captured by the camera resource. The second gadget 706 instructs the access system 100 to make the camera resource accessible to the application module for an entire session. Similarly, the third gadget 708 instructs access system 100 to make the camera resource available to the application module for an open-ended span of time, e.g., extending over multiple sessions. A user can selectively remove the permission granted by the gadget 706 or the gadget 708 at any time.

Figure 8:
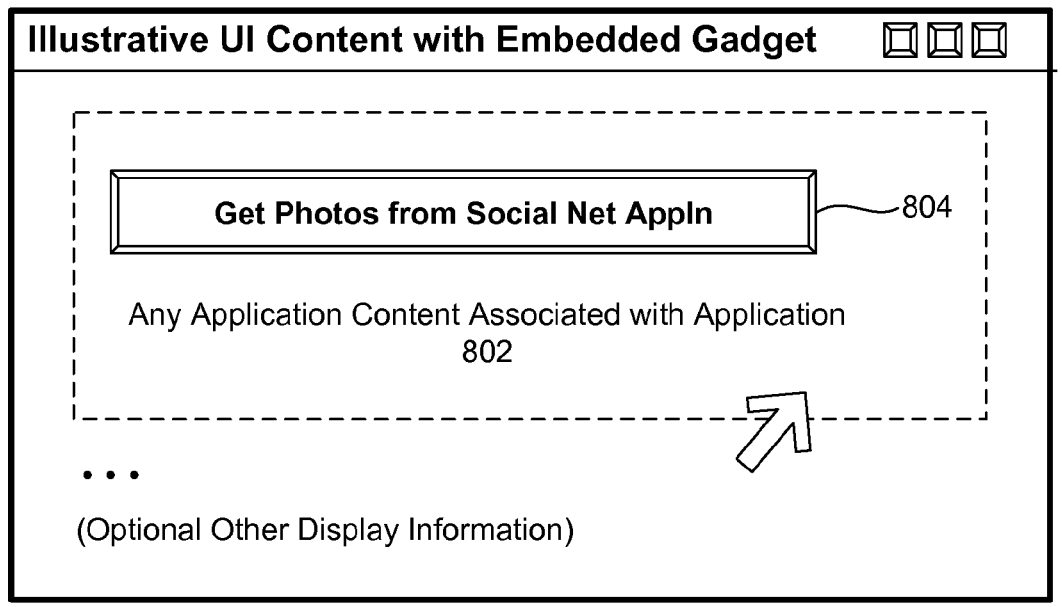
FIG. 8 shows another example of an application UI that includes a gadget embedded therein. This gadget allows a corresponding application module to receive data from another application module.

FIG. 8 shows an application UI 802 presented by a first application module for performing any function. A provider module presents a gadget 804 within the application UI 802.

Upon activating this gadget 804, the access system 100 pulls data from a second application module and makes that data available to the first application module. For example, the data may comprise one or more images maintained by the second application.

Figure 9:
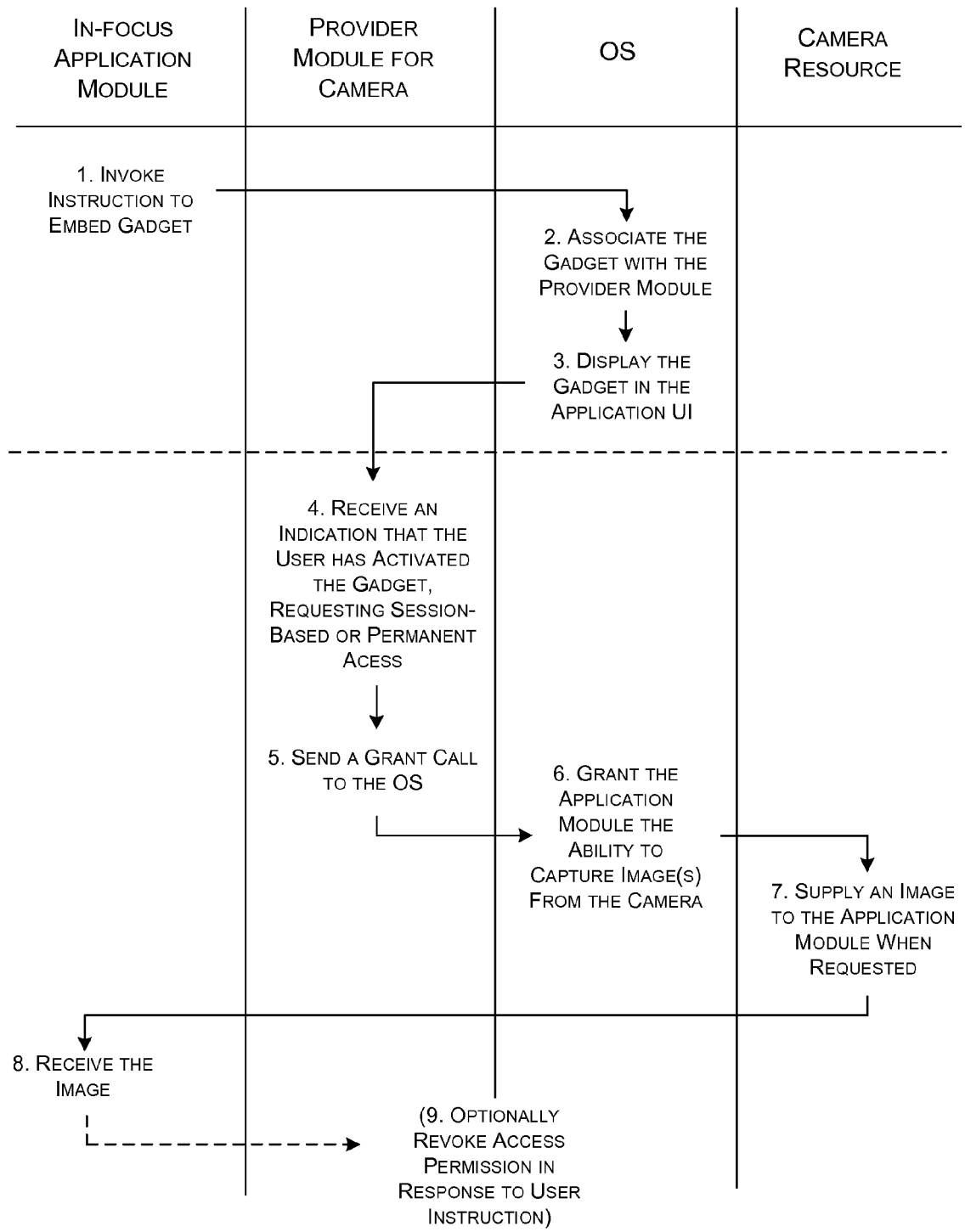
FIG. 9 shows one method whereby the access system (of FIG. 1) can access an image in response to the user's activation of a gadget (shown in FIG. 7). That is, activation of this gadget confers session-based or permanent access to a camera resource.

FIG. 9 shows a procedure that describes one way that the access system 100 can allow an application module to interact with a camera resource upon activation of either gadget 706 or gadget 708 shown in FIG. 7. In operation (1), during the setup of the application UI, the application module invokes a command to embed either gadget 706 or gadget 708 in the application UI 702. The command may specify the type of gadget to be embedded, the location of the gadget within the application UI 702, the user-owned resource associated with the gadget, and the duration of access granted by the gadget. In operation (2), the operating system 116 binds a particular provider module to the gadget. The provider module is associated with the camera resource. In operation (3), the operating system 116 displays the application UI 702, along with the gadget 706 or the gadget 708 embedded therein.

In operation (4), the provider module detects that the user has activated the gadget using any input mechanism, e.g., by clicking on the button associated with gadget 706 or gadget 708. In operation (5), the provider module sends a grant call to the operating system 116. The grant call specifies that the application module (a destination entity) seeks to gain access to the camera resource (a source entity) to receive images over the course of a session, or permanently. In operation (6), the operating system 116 grants the application module the ability to capture images from the camera. It performs this task by changing a state entry in the access control module 410. In operation (7), the camera resource supplies an image to the application module whenever it is requested to do so by the application module. In operation (8), the application module receives an image from the camera resource. In operation (9), the user can optionally revoke any extended access rights that have been granted to the application module with respect to the camera resource.

Figure 10:
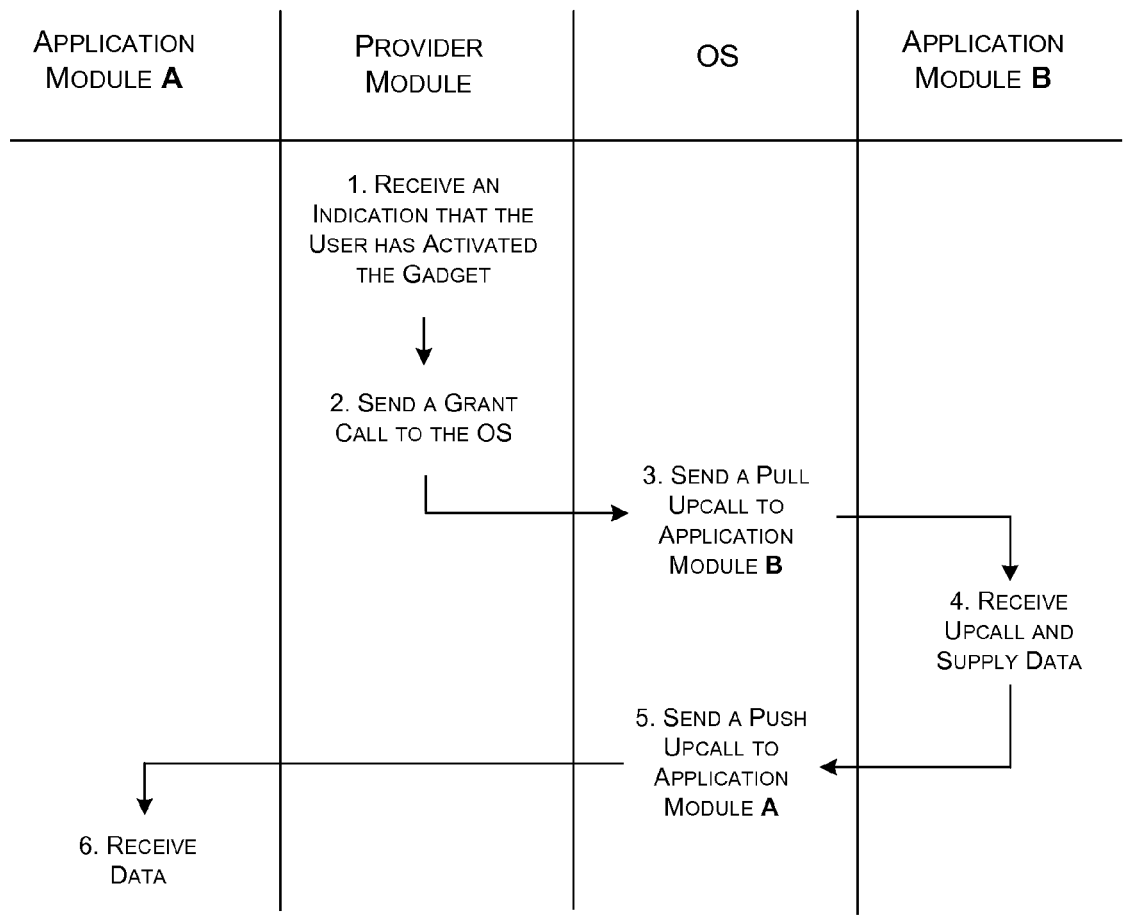
FIG. 10 shows one method by which the access system can access data from an application module in response the user's activation of the gadget shown in FIG. 8.

FIG. 10 shows a procedure which represents one way that the access system can respond to the activation of the gadget 804 shown in FIG. 8. In operation (1), the appropriate provider module can receive an indication that the user has activated the gadget 804. In operation (2), the provider module sends a grant call to the operating system 116. In operation (3), the operating system 116 sends a pull upcall to the source application module from which the data will be supplied. In operation (4), the source application module supplies the requested data. In operation (5), the operating system 116 pushes the data supplied by the source application to the in-focus destination application module (with which the user is currently interacting). In operation (6), the in-focus destination application module receives the data.

Figure 11:
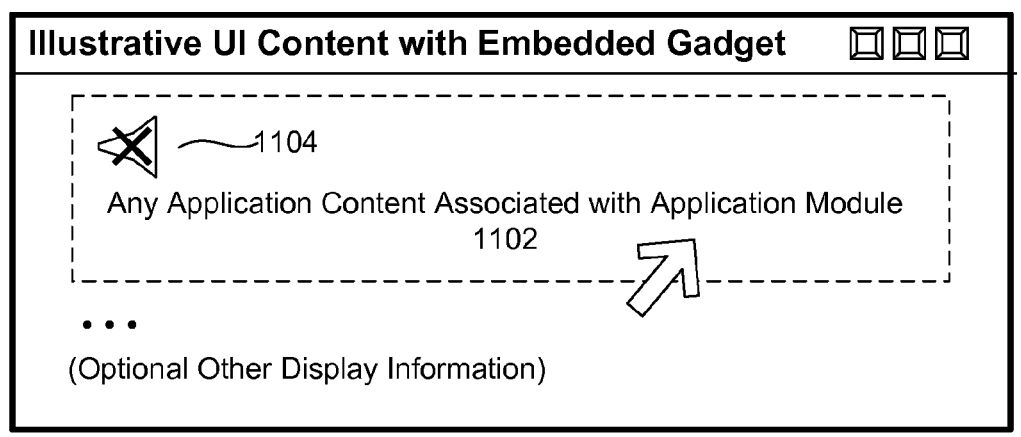
FIG. 11 shows another example of an application UI that includes a gadget embedded therein. This gadget allows a corresponding application module to change the status of a user-owned resource, in this case, by muting and un-muting a speaker resource.
Figure 12:
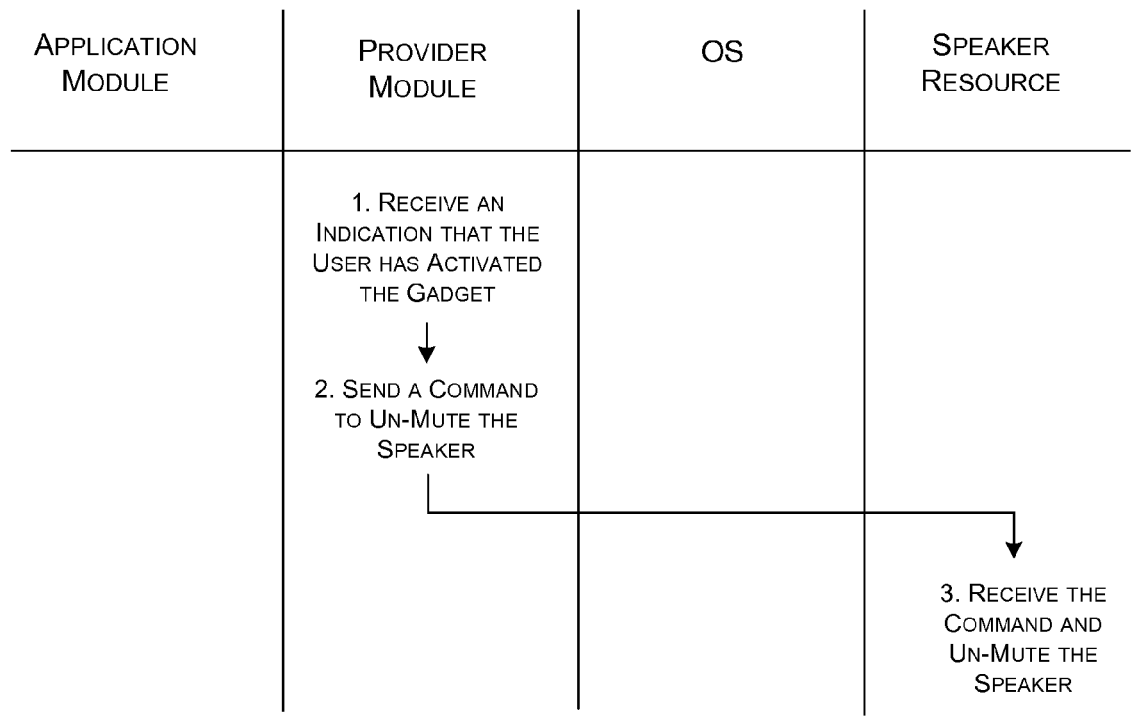
FIG. 12 shows one method by which the access system can change the status of a user-owned resource in response the user's activation of the gadget shown in FIG. 11.

FIG. 11 shows an application UI 1102 which includes a gadget 1104 for muting and un-muting a speaker resource. FIG. 12 shows a procedure whereby the access system 100 can respond to the user's activation of this gadget 1104. Presume that the user seeks to un-mute the speaker resource. In operation (1), the provider module receives an indication that the user has activated the gadget 1104. In operation (2), the provider module directly sends an un-mute command to the speaker resource. In operation (3), the speaker resource responds to the command by un-muting the speaker resource.

Figure 13:
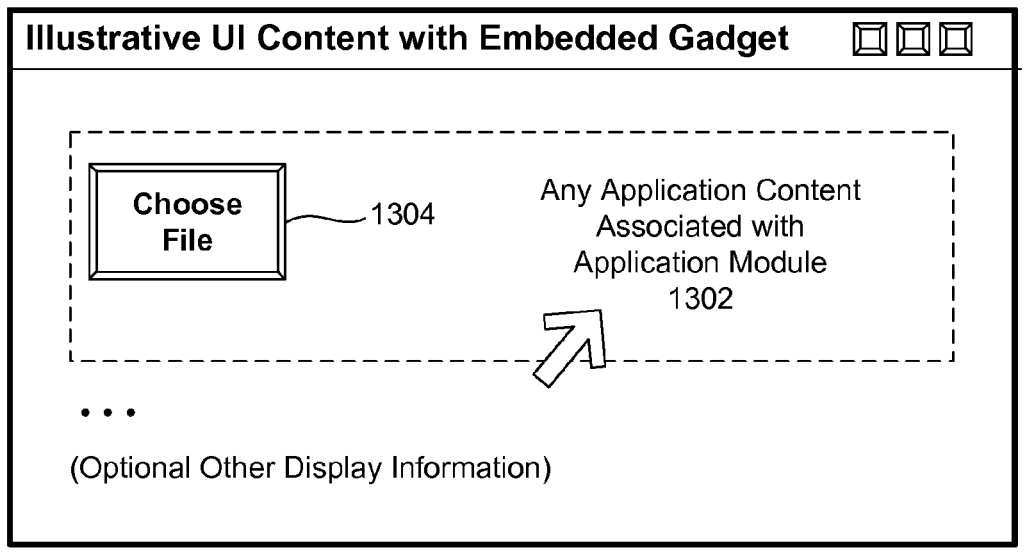
FIG. 13 shows another example of an application UI with a gadget embedded therein. This gadget allows a corresponding application module to initiate a file-picking operation.

FIG. 13 shows an application UI 1302 which includes a gadget 1304 that initiates a file-picking operation. By clicking this gadget 1304, the user instructs the access system 100 to identify data items that are maintained by one or more user-owned resources. These user-owned resources, for example, may pertain to different application modules or repositories that store the data items that are "owned" by the user. Although not shown, a variant of the gadget 1304 can include a user interface mechanism to receive information that specifies the set of user-owned resources to be queried in the file-picking operation. For example, the user can specify the user-owned resources by individually identifying each of the user-owned resources to be queried, and/or by specifying wildcard parameters which encompass the set of user-owned resources to be queried.

Figure 14:
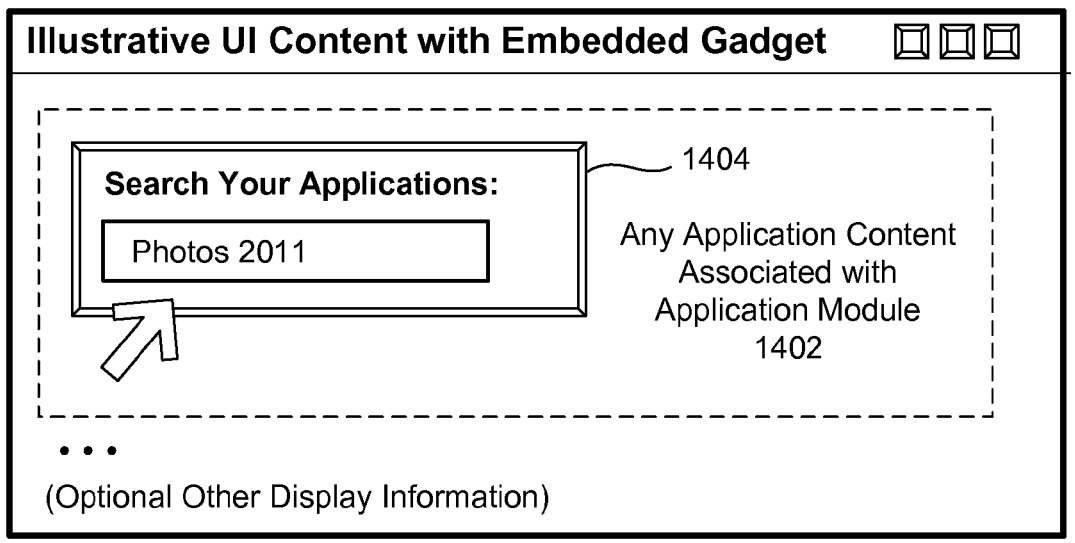
FIG. 14 shows another example of an application UI with a gadget embedded therein. This gadget allows a corresponding application module to initiate a search operation.

FIG. 14 shows an application UI 1402 which includes a gadget 1404 that initiates a search operation. By entering a search term into this gadget 1404 and then activating it, the user instructs the access system 100 to identify the data items that are maintained by one or more user-owned resources which match the search term that the user has specified. Again, these user-owned resources may pertain to different application modules or repositories that store data items that are owned by the user. Further, a variant of the gadget 1404 can include a user interface mechanism to receive information that specifies the set of user-owned resources to be queried in the search operation.

Figure 15:
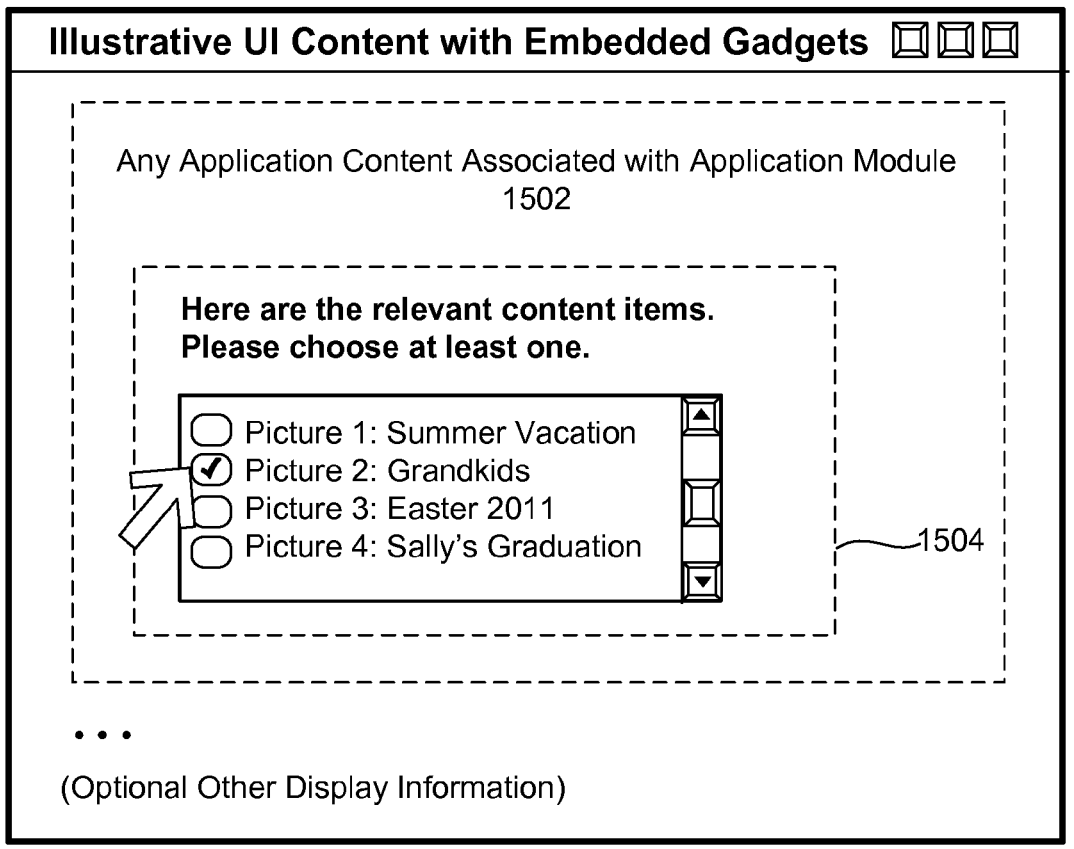
FIG. 15 shows another example of an application UI with a gadget embedded therein. This gadget displays a collection of view items associated with respective data items. The access system supplies these view items in response to activation of the gadget shown in FIG. 13.

FIG. 15 shows an application UI 1502 which includes another gadget 1504. This gadget 1504 represents the result of activating the file-picking gadget 1304 of FIG. 13. More specifically, in response to activating of the gadget 1304, the access system 100 determines the data items that are stored within the appropriate user-owned resources. The access system 100 then generates view items associated with the data items. The view items describe the respective data items. For example, assume that the data items correspond to image files; in this case, the view items may correspond to the names of the image files. The access system 100 then lists the view items within the gadget 1504. At this stage, the access system 100 has not provided the actual content of the data items. Rather, it merely identifies the data items that can be subsequently accessed from the appropriate user-owned resources. As described in Section A, the gadget 1504 is isolated from the application UI 1502. Further, the provider of the gadget 1504 is isolated from the view items that are presented within the gadget 1504.

The gadget 1504 invites the user to select one or more of the view items. In response to such selection, the access system 100 accesses the appropriate user-owned resources to obtain the corresponding data items, making the data items available to the in-focus application module (associated with the application UI 1502). More specifically, this operation does not grant the in-focus application module general access to the user-owned resources associated with the data items; rather, this operation supplies just the particular data items that have been identified from the appropriate user-owned resources.

The search operation is similar to the file-picking operation described above. That is, upon activating the gadget 1404 of FIG. 14, the access system 100 presents a second gadget which displays a set of view items. The view items represent search results which match the user's search term specified via the gadget 1404. The user may then select one or more of the view items to retrieve the actual data items associated with the selected view items.

Figure 16:
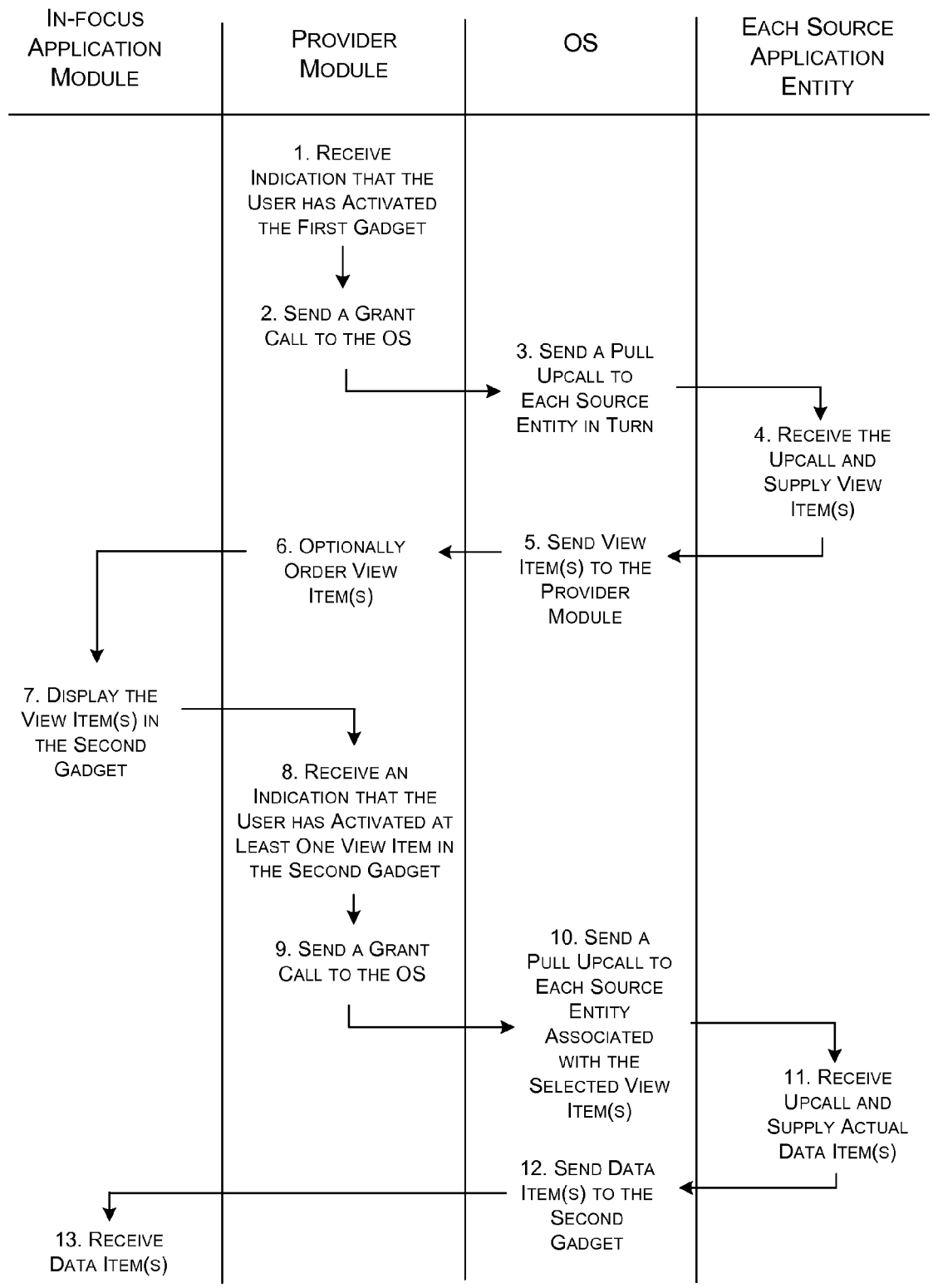
FIG. 16 shows one method by which the access system can implement a file-picking or search operation in response to the user's activation of the gadget shown in FIG. 13 or the gadget shown in FIG. 14, followed by the user's interaction of the gadget shown in FIG. 15.

FIG. 16 shows a procedure which further clarifies the operation of the file-picking operation or the search operation. In operation (1), the provider module receives an indication the user has activated a first gadget that initiates the file-picking operation or the search operation. In operation (2), the provider module sends a grant call to the operation system 116. In operation (3), the operating system 116 sends a pull upcall to each source entity module in turn (where user data maintained by each source entity (e.g., a source application module) represents a user-owned resource). In operation (4), each source entity sends one or more view items that match the pull upcall. In operation (5), the operating system 116 sends the view items to the provider module using a push upcall. In operation (6), the provider module can optionally organize the view items received from different source entities, e.g., by sorting them in any manner. In operation (7), the in-focus destination application module displays the view items in a second gadget, such as the gadget 1504 of FIG. 15.

In operation (8), the provider module receives an indication that the user has selected one or more view items in the second gadget. In operation (9), the provider module sends a grant call to the operation system 116. In operation (10), the operating system 116 sends a pull upcall to each source entity associated with the selected view item(s). In operation (11), each source entity that has been contacted supplies a data item (or data items) corresponding to the selected view item (or view items). In operation (12), the operating system 116 pushes the data items to the in-focus destination application module. In operation (13), the in-focus application module can receive the data items that the user has requested via the second gadget.

Figure 17:
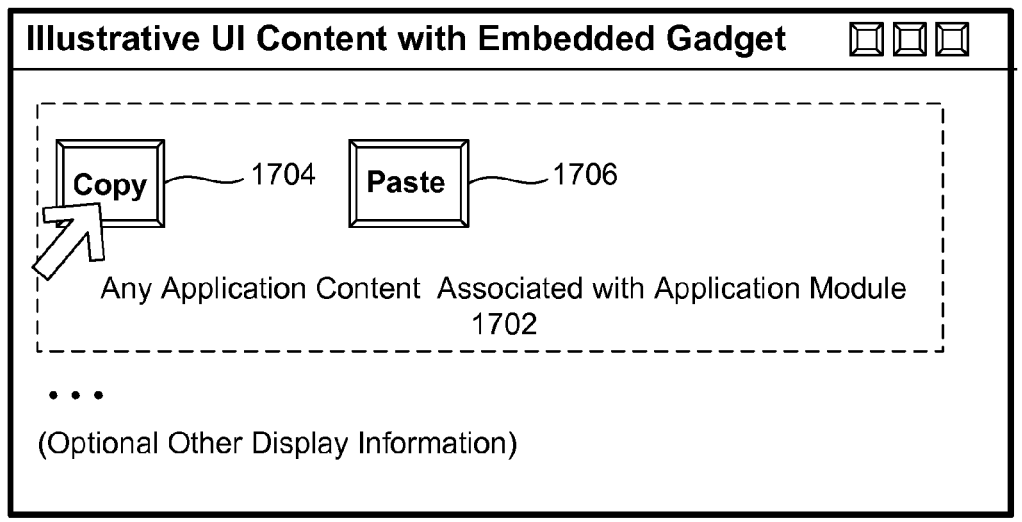
FIG. 17 shows another example of an application UI with a gadget embedded therein. This gadget allows a corresponding application module to initiate either a copy operation or a paste operation.

FIG. 17 shows an application UI 1702 that includes a copy gadget 1704 and a paste gadget 1706. The user can invoke the copy gadget 1704 to copy designated data (e.g., from an in-focus application module) into the clipboard resource. The user can invoke the paste gadget 1706 to paste data from the clipboard resource into the in-focus application module.

Figure 18:
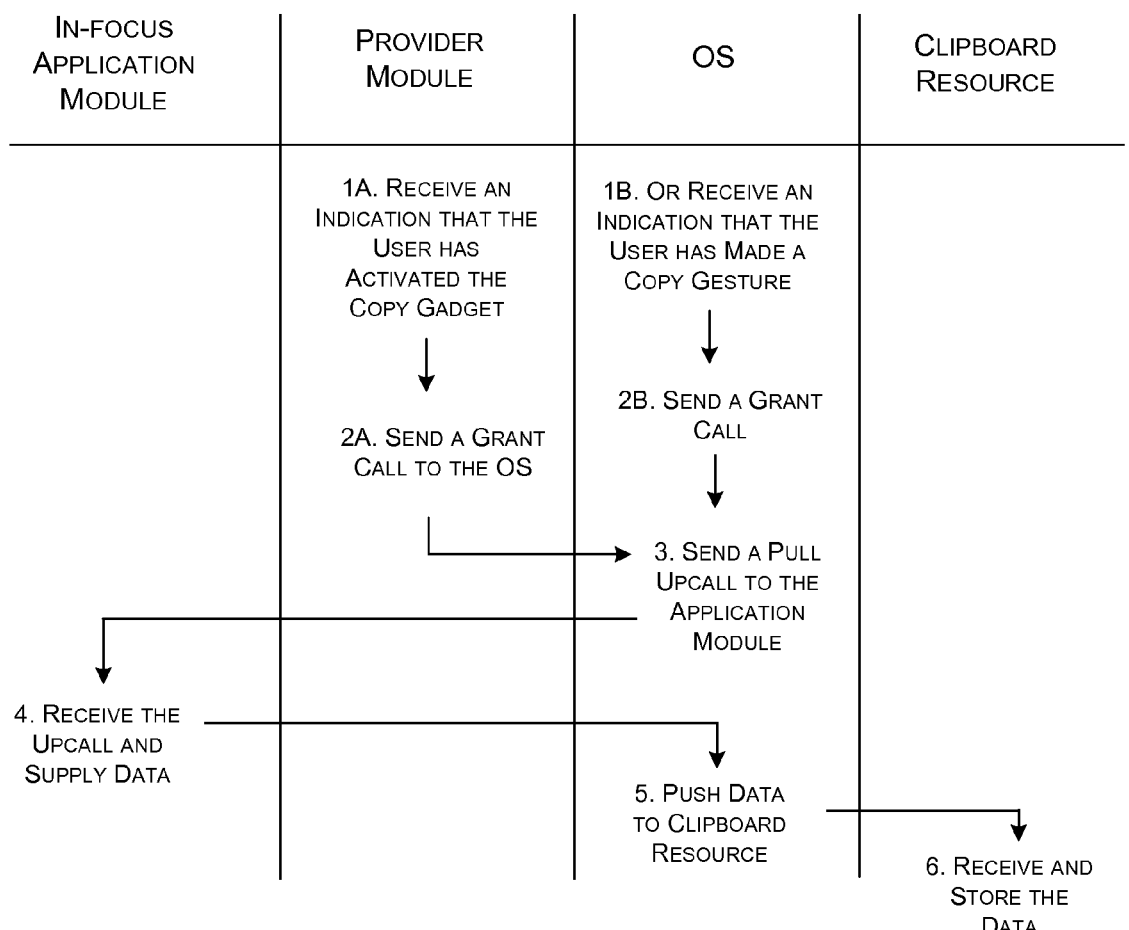
FIG. 18 shows one method by which the access system can perform a copy operation in response to activation of the copy gadget shown in FIG. 17, or in response to the detection of a copy gesture made by the user.

FIG. 18 shows a procedure that explains one way that the access system 100 can respond the user's activation of a copy operation. In operation (1A), the provider module receives an indication that the user has activated the copy gadget 1704. In operation (2A), the provider module can send a grant call to the operating system 116. Alternatively, in operation (1B), the operating system 116 can detect that the user has performed a gesture which is associated with the copy operation (without interacting with the copy gadget 1704). In operation (2B), the operating system 116 generates an internal grant call.

In either event (whether a gadget or a gesture has been activated), in operation (3), the operating system 116 can send a pull upcall to the in-focus application module. In operation (4), the in-focus application module can receive the upcall and supply the designated data for copying. In operation (5), the operating system 116 can push the data to the clipboard resource for storage. In operation (6), the clipboard resource can store the data.

Figure 19:
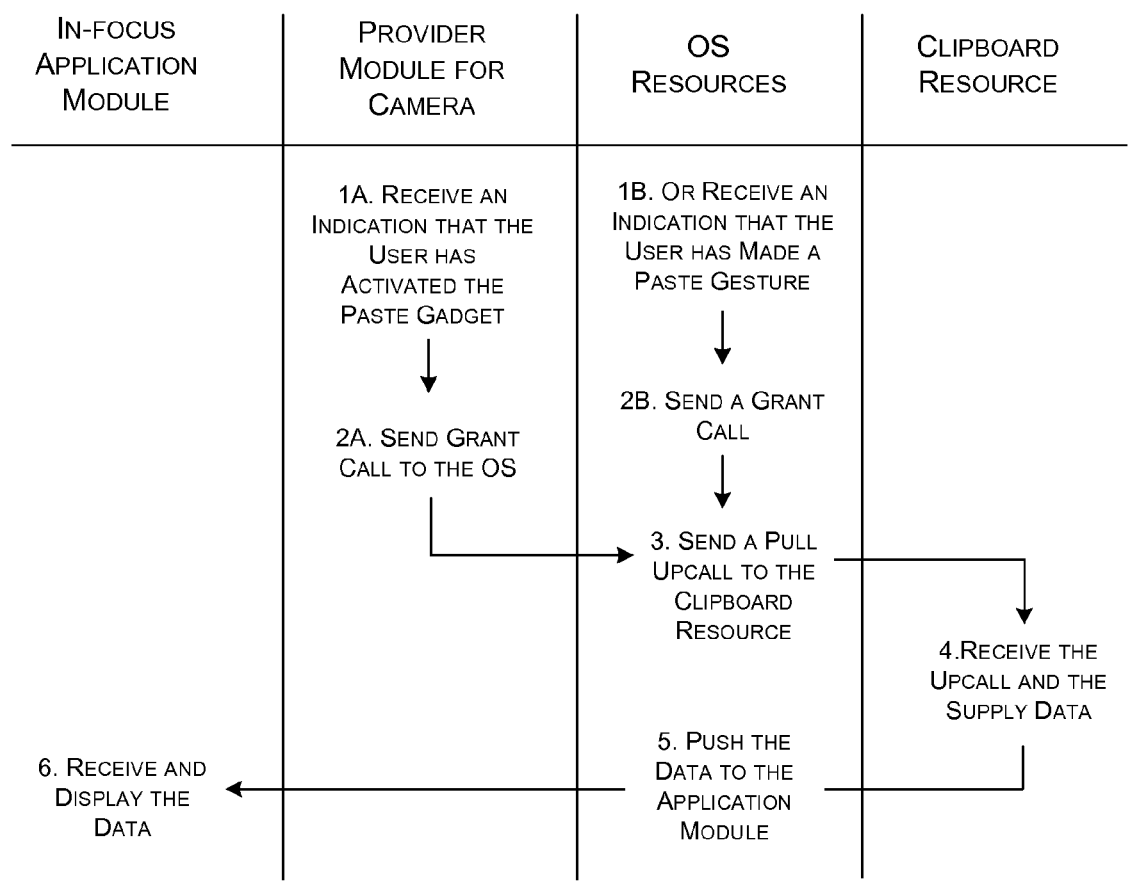
FIG. 19 shows one method by which the access system can perform a paste operation in response to activation of the paste gadget shown in FIG. 17, or in response to the detection of a paste gesture made by the user.

FIG. 19 shows one procedure by which the access system 100 can respond to activation of a paste operation. In operation (1A), the provider module receives an indication that the user has activated the paste gadget 1706. In operation (2A), the provider module sends a grant call to the operating system 116. Alternatively, in operation (1B), the operating system 116 detects that the user has performed a telltale gesture that invokes the paste operation. In operation (2B), the operating system 116 generates an internal grant call.

In operation (3), regardless of whether the user has activated the paste operation via the gadget 1706 or a gesture, the operating system 116 sends a pull upcall to the clipboard resource. In operation (4), the clipboard resource supplies the data which it has stored. In operation (5), the operating system 116 pushes the data from the clipboard resource to the in-focus application module. In operation (6), the in-focus application module receives the data.

Figure 20:
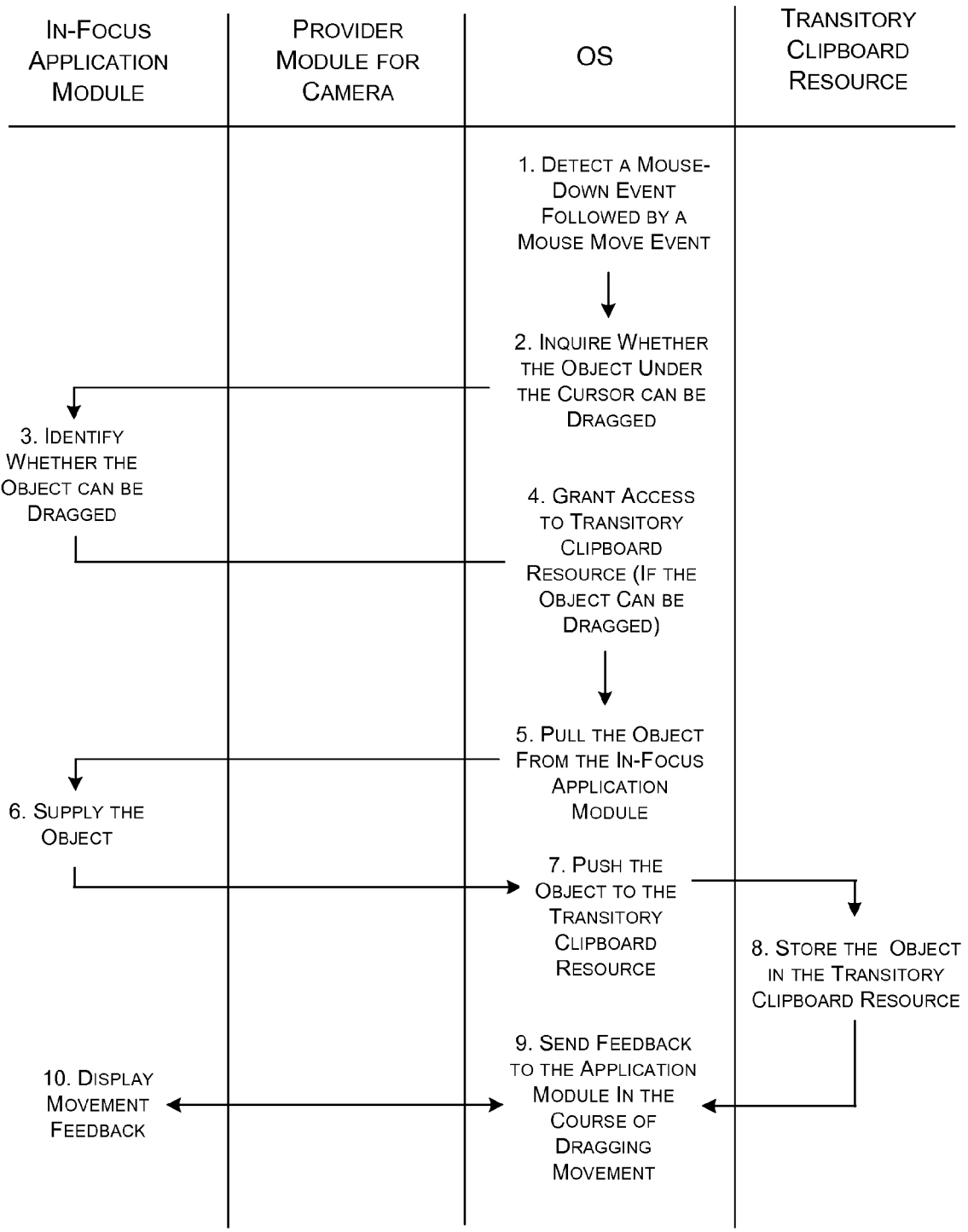
FIGS. 20 and 21 together show one method by which the access system can perform a drag-and-drop operation in response to the user performing drag and drop actions using a mouse device (or some other input mechanism).
Figure 21:
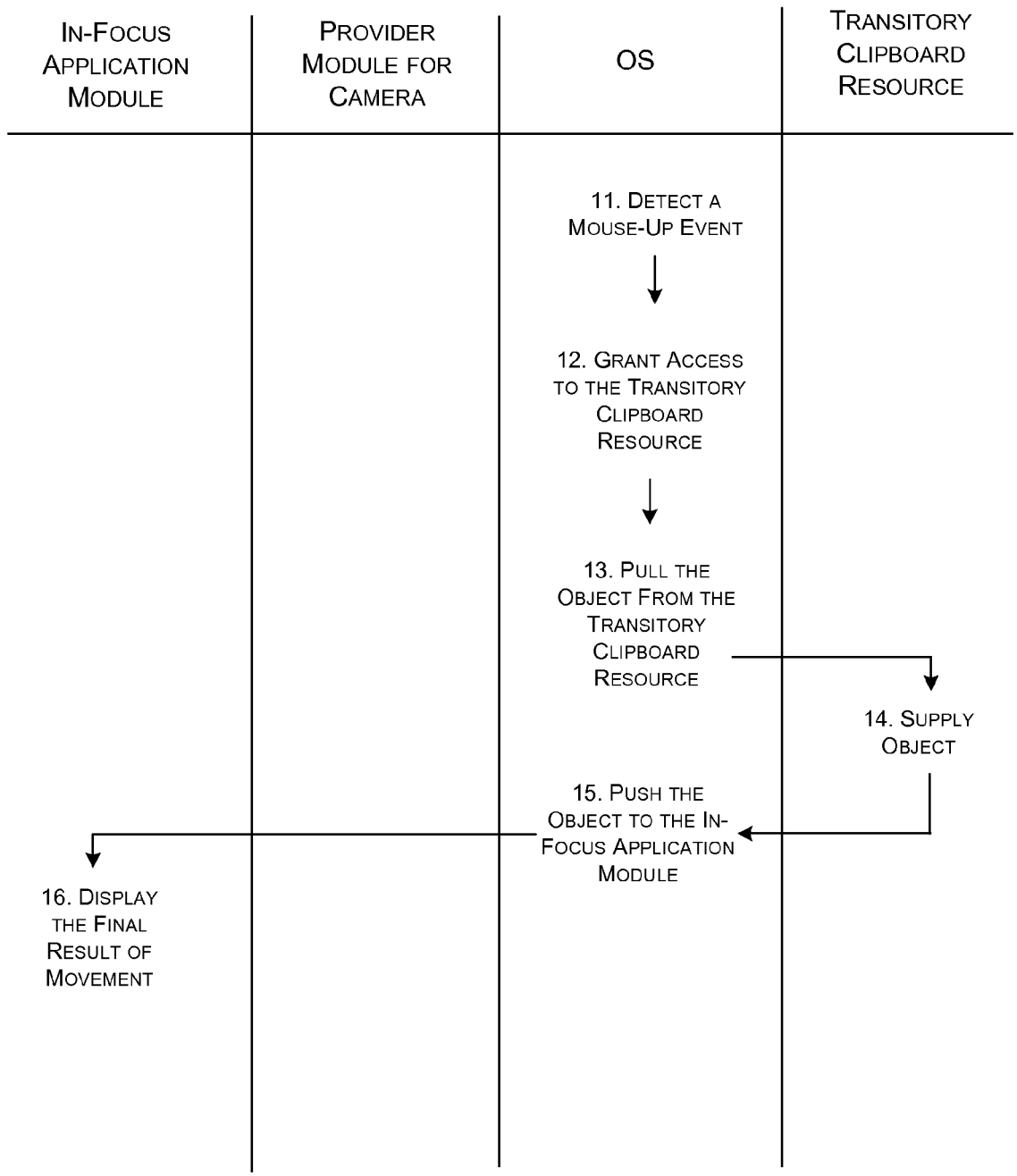

The last procedure, depicted in FIGS. 20 and 21, shows one way that the access system 100 can perform a drag-and-drop procedure. This procedure can be invoked by detecting a drag-and-drop gesture that the user makes using a mouse device. But this procedure can also be invoked through other interaction mechanisms. The user-owned resource that is affected by this operation corresponds to a transitory clipboard resource. The transitory clipboard resource stores the object that is being dragged.

Beginning with FIG. 20, in operation (1), the operating system 116 detects a mouse down event followed by a mouse movement. A mouse down event occurs when the user has moved the cursor over a movable object and then clicked a button on the mouse device (holding that button down). In operation (2), the operating system 116 sends an upcall to the in-focus application module to determine whether the object which underlies the cursor is a movable object. In operation (3), the operating system 116 identifies whether the object can be moved. In operation (4), if the object can be moved, the operating system 116 generates a grant call which gives the in-focus application module the authority to access the transitory clipboard resource. For example, the grant call may correspond to GrantAcess (inFocusApp, "transient clipboard", "put"). In operation (5), the operating system 116 carries out the grant call by first issuing a pull upcall to the in-focus application module. In operation (6), the in-focus application module supplies the object to be dragged. In operation (7), the operating system 116 issues a push upcall to the transitory clipboard resource. In operation (8), the transitory clipboard resource stores the object.

At this stage, the procedure assumes that the user drags the object over the UI. In operation (9), in the course of the movement, the operating system 116 sends feedback information to the in-focus application regarding the progress of the user's movement across a display space, e.g., by specifying DragOver events within successive upcalls. The feedback information (provided in upcalls) can also specify a DragLeave event when the user leaves a window region and a DragEnter event when the user enters a window region. In operation (10), the in-focus application module responds to the feedback information by presenting appropriate visual feedback to the user, which allows the user to appropriately gauge the status of the drag-and-drop operation.

Continuing in FIG. 21, in operation (11), the operating system 116 eventually detects a mouse up event. A mouse up event occurs when a user releases the depressed button of the mouse device at a certain drop location on the UI. In operation (12), the operating system 116 responds to the mouse up event by generating a grant call, giving the in-focus application module authority to now access the object in the transitory clipboard resource. Such a grant call can take the form of GrantAcess ("transient clipboard", inFocusApp, "get"). In operation (13), the operating system 116 responds to the grant call by first issuing a pull upcall to the transitory clipboard resource. In operation (14), the transitory clipboard resource responds to the pull upcall by supplying the object stored therein. In operation (15), the operating system 116 pushes the object to the in-focus application module. In operation (16), the in-focus application module presents a visual rendering of the object, placed at the drop location in the UI.

FIG. 22 presents a case in which a top-level application UI 2202 includes a gadget 2204 embedded therein. The top-level application UI 2202 also includes a region devoted to displaying a nested application UI 2206. In one case, the interface management module 414 (of FIG. 4) can prevent, as a default, the nested application UI 2206 from embedding its own gadgets. However, the top-level application module (which presents the top-level application UI 2202) can also expressly confer the right of the nested application module to embed gadgets in the nested application UI 2206.

The access system 100 isolates the application module which provides the application UI 2202 from the provider module which provides the gadget 2204. The access system 100 also isolates the application module which provides the application UI 2202 from the application module which provides the application UI 2206. More specifically, the application module which provides the application UI 2202 can overlap, resize, and move the application UI 2206, but it cannot access the pixels of the application UI 2206.

Figure 23:
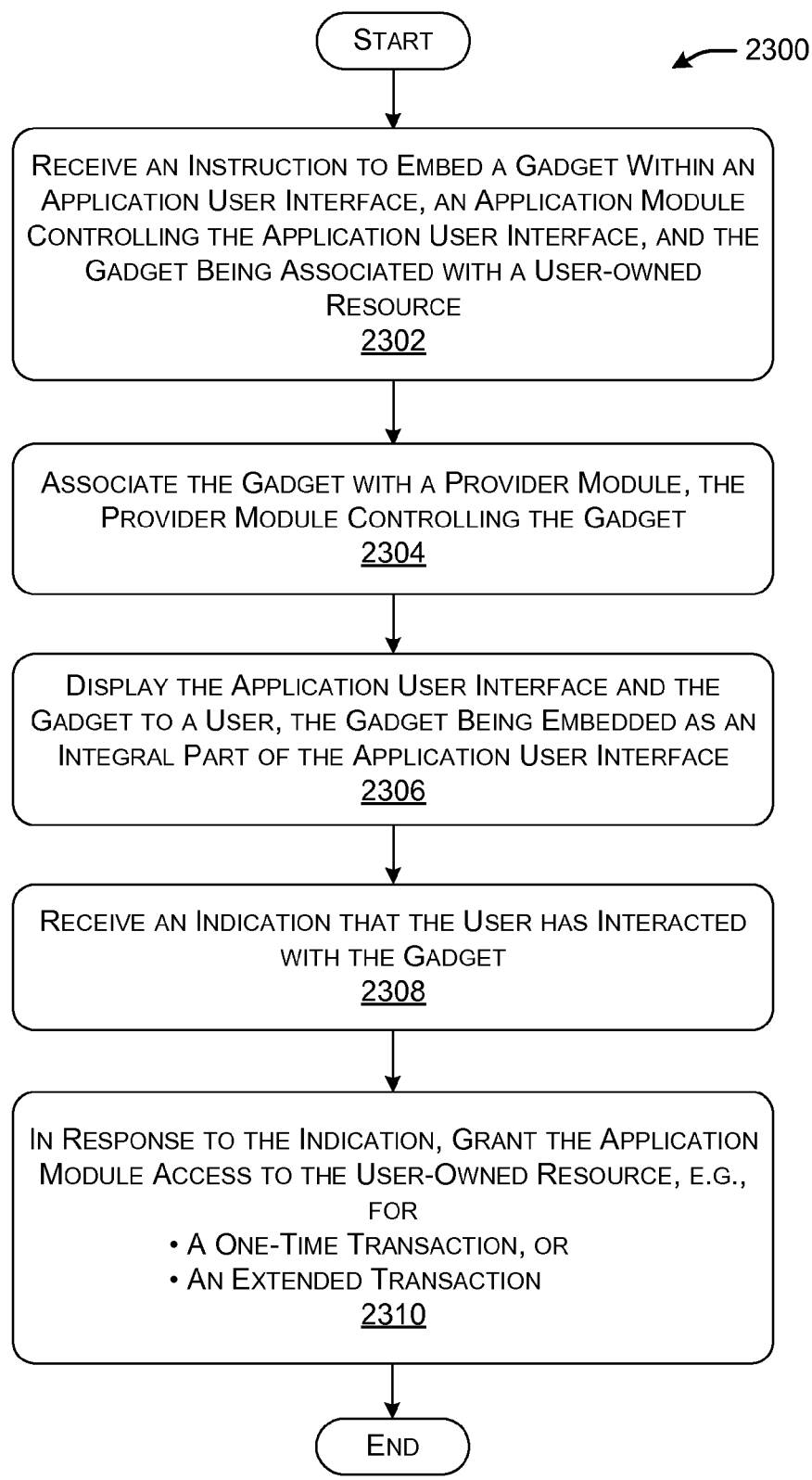
FIG. 23 is a flowchart that represents an overview of one method whereby the access system (of FIG. 1) can grant an application module access to a user-owned resource in response to a user's activation of a gadget.

FIG. 23 shows a procedure 2300 which represents a summary of some of the gadget-related access actions described above. In block 2302, the access system 100 receives an instruction to embed a gadget within an application user interface. A particular application module controls the application user interface. In block 2304, the access system 100 associates the gadget with a provider module. The provider module controls the gadget. The gadget (and the provider module), in turn, govern the application module's access to a particular user-owned resource. In block 2306, the access system 100 displays the application user interface and the gadget to a user on a user device. The gadget is perceived as being embedded as an integral part of the application user interface. In block 2308, the access system 100 receives an indication that the user has interacted with the gadget. And in block 2310, the access system, in response to receiving the indication, grants the application module access to the user-owned resource.

Figure 24:
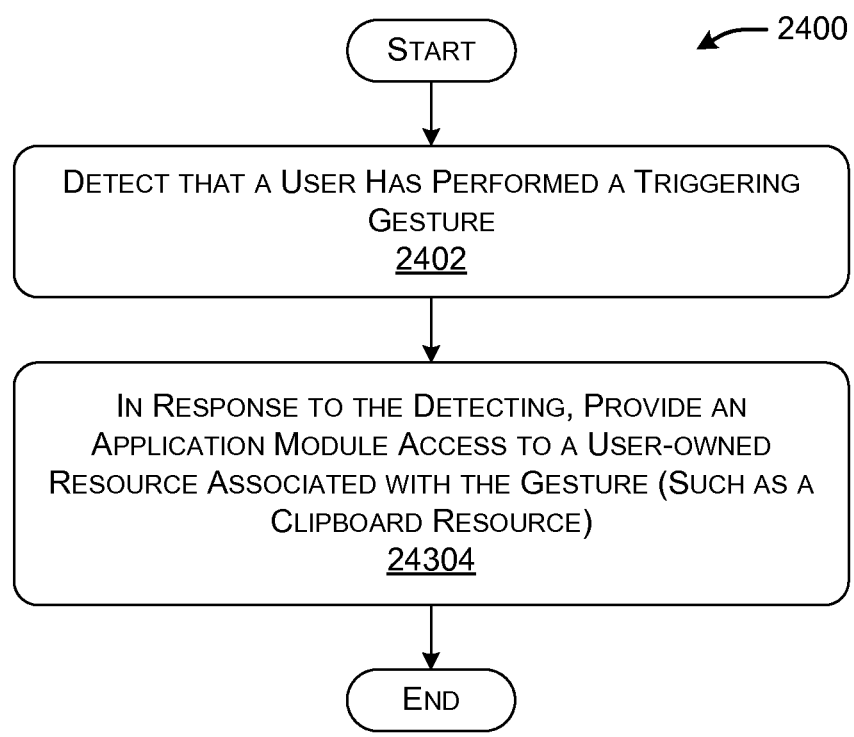
FIG. 24 is a flowchart that represents an overview of one method whereby the access system (of FIG. 1) can grant an application module access to a user-owned resource in response to a user's execution of a telltale gesture.

FIG. 24 is a procedure 2400 which represents a summary of some of the gesture-related access actions described above. In block 2402, the access system 100 detects that a user has performed a gesture using an input mechanism of the user device. In block 2404, in response to the detection of the gesture, the access system 100 provides an in-focus application module access to the user-owned resource associated with the gesture, for the purposes of performing a particular operation associated with the gesture (e.g., a copy operation, a paste operation, etc.).

C. Representative Computing Functionality

Figure 25:
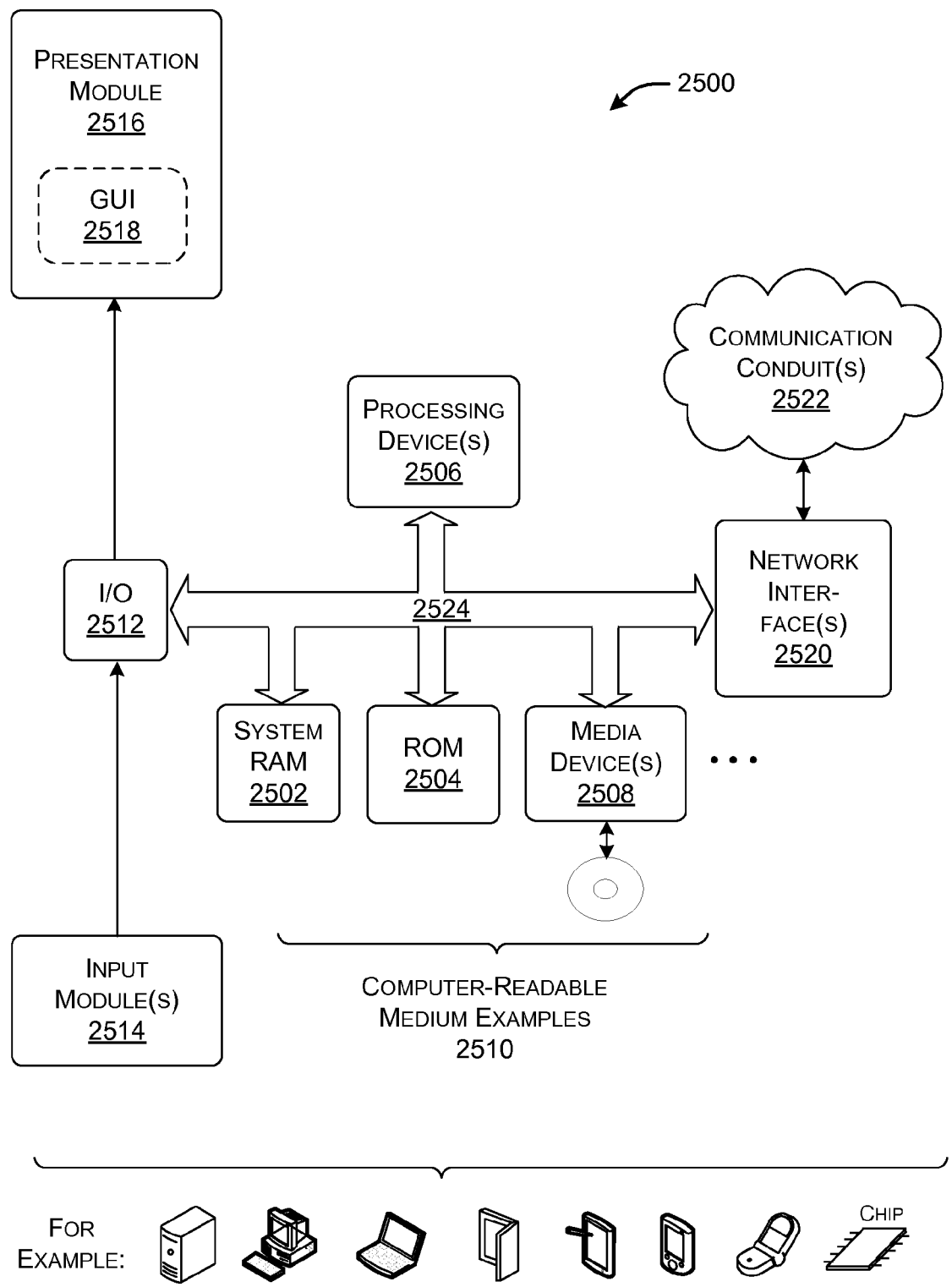
FIG. 25 shows illustrative computing functionality that can be used to implement any aspect of the features shown in the foregoing drawings.

FIG. 25 sets forth illustrative computing functionality 2500 that can be used to implement any aspect of the functions described above. For example, the computing functionality 2500 can be used to implement any aspect of the access system 100 of FIG. 1, e.g., as implemented in the embodiment of FIG. 5 or FIG. 6, or in some other embodiment. In one case, the computing functionality 2500 may correspond to any type of computing device that includes one or more processing devices. In all cases, the electrical data computing functionality 2500 represents one or more physical and tangible processing mechanisms.

The computing functionality 2500 can include volatile and non-volatile memory, such as RAM 2502 and ROM 2504, as well as one or more processing devices 2506 (e.g., one or more CPUs, and/or one or more GPUs, etc.). The computing functionality 2500 also optionally includes various media devices 2508, such as a hard disk module, an optical disk module, and so forth. The computing functionality 2500 can perform various operations identified above when the processing device(s) 2506 executes instructions that are maintained by memory (e.g., RAM 2502, ROM 2504, or elsewhere).

More generally, instructions and other information can be stored on any computer readable medium 2510, including, but not limited to, static memory storage devices, magnetic storage devices, optical storage devices, and so on. The term computer readable medium also encompasses plural storage devices. In all cases, the computer readable medium 2510 represents some form of physical and tangible entity.

The computing functionality 2500 also includes an input/output module 2512 for receiving various inputs (via input modules 2514), and for providing various outputs (via output modules). One particular output mechanism may include a presentation module 2516 and an associated graphical user interface (GUI) 2518. The computing functionality 2500 can also include one or more network interfaces 2520 for exchanging data with other devices via one or more communication conduits 2522. One or more communication buses 2524 communicatively couple the above-described components together.

The communication conduit(s) 2522 can be implemented in any manner, e.g., by a local area network, a wide area network (e.g., the Internet), etc., or any combination thereof. The communication conduit(s) 2522 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by computing functionality, for granting an application module access to a user-owned resource, comprising:

receiving an instruction to include a gadget within an application user interface, the application module controlling the application user interface, and the gadget being associated with the user-owned resource;

associating the gadget with a provider module, the provider module operable to control the gadget;

displaying the application user interface and the gadget on a display mechanism, the gadget being embedded as an integral part of the application user interface;

receiving an indication of interaction with the gadget; and in response to receiving the indication, granting the application module access to the user-owned resource, the granting comprising sending a grant call to a system of a user device, based at least on initiating a setting of a state entry of an access control module, the state entry enabling the application module to access the user-owned resource for a duration, the application module otherwise lacking rights to access user-owned resources.

2. The method of claim 1, wherein the user-owned resource comprises functionality associated with the user device, comprising:
- a camera resource;
- a microphone resource; or
- a GPS device resource.

3. The method of claim 1, wherein:
- the user-owned resource comprises data that is associated with a source entity, and
- the provider module is separated from, and isolated from, the application module.

4. The method of claim 1, wherein the instruction comprises a system call, triggered by the application module, which specifies a location at which to present the gadget within the application user interface.

5. The method of claim 4, wherein the instruction also specifies:
- a type of the gadget; and
- an identity of the user-owned resource.

6. The method of claim 1, wherein the gadget includes at least one user interface control mechanism, and wherein at least a portion of the interaction with the gadget is achieved via activation of the user interface control mechanism.

7. The method of claim 1, wherein said granting comprises:
- providing a command, by the provider module, directly to the user-owned resource; and
- in response to the command, changing, by the user-owned resource, a status of the user-owned resource.

8. The method of claim 1, wherein said granting comprises:
- sending the grant call to an operating system of the user device; and
- in response to the grant call, setting, by the operating system, the state entry in the access control module, the state entry enabling the application module to access the user-owned resource for a specified scope of access.

9. The method of claim 1, wherein said granting comprises:
- sending the grant call to an operating system of the user device; and
- in response to the grant call, issuing a pull upcall to a source entity, requesting the source entity to provide data; and
- issuing a push upcall to a target entity, requesting the destination entity to accept the data that is provided by the source entity,
- wherein either the source entity or the destination entity is the user-owned resource.

10. The method of claim 1, further comprising:
- detecting, by an operating system of the user device, a gesture input from an input mechanism of the user device; and
- in response to said detecting, granting, by the operating system, the application module access to a user-owned resource that is associated with the gesture input.

11. The method of claim 10, wherein the user-owned resource that the operating system provides access to includes a clipboard resource, and wherein the gesture input is associated with either:
- a copy operation that includes copying data from the application module to the clipboard resource, or
- a paste operation that includes pasting data from the clipboard resource to the application module.

12. A method comprising:
- presenting a first gadget, included in an application user interface, on a display, a provider module being operable to control the first gadget, and the application user interface being controlled by an application module;
- receiving an indication of interaction with the first gadget;
- in response to said receiving, obtaining one or more view items associated with one or more respective data items from at least one source entity;
- presenting said one or more view items using a second gadget, the second gadget included in the application user interface, the provider module being operable to control the second gadget;
- receiving an indication of interaction with the second gadget by from selection of at least one view item that is presented by the second gadget;
- in response to receiving the indication of interaction with the second gadget, granting the application module access to a user-owned resource, the granting comprising sending a grant call to an operating system of the user device, obtaining at least one data item which is associated with said at least one view item that has been selected, the obtaining based at least on initiating a setting of a state entry of an access control module, the state entry enabling the application module to access the at least one data item for a duration; and
- providing said at least one data item to the application module.

13. The method of claim 12, wherein:
- said obtaining one or more view items comprises identifying one or more files that are maintained by said at least one source entity, and wherein:
- the provider module is separated from, and isolated from, the application module.

14. The method of claim 12, wherein said obtaining one or more view items comprises identifying one or more search results from said at least one source entity, said one or more search results matching a search term specified via the first gadget.

15. An access system for granting an application module access to a user-owned resource, the access system comprising:
- at least one hardware processor;
- at least one computer readable medium storing instructions that are executable by one or more of the at least one hardware processor, for implementing:
- an application module operable to control an application user interface, the access system operable to isolate the application module from other application modules that are executable on the access system;
- a provider module operable to control a gadget that forms an integral part of the application user interface, the gadget being presented at a location within the application user interface that is specified by the application module;
- a user-owned resource associated with the provider module;
- an operating system which, together with the provider module, enables the application module to access the user-owned resource;
- an interaction detection module operable to detect interaction with the gadget, to provide an indication; and
- an access action module operable to respond to the indication by granting the application module access to the user-owned resource, the granting comprising sending a grant call to an operating system of the user device, while otherwise restricting access by the application module to user-owned resources, based at least
- on a least-access paradigm, the granting based on initiating a setting of a state entry of an access control module, the state entry enabling the application module to access the user-owned resource for an extended duration of access.

16. The access system of claim 15, wherein:

the interaction detection module is implemented by the provider module, the access action module is implemented by the operating system, and wherein the interaction detection module is operable to send the grant call to the access action module in response to the indication, and wherein:

the provider module is separated from, and isolated from, the application module.

17. The access system of claim 16, wherein the access action module comprises an extended access action module which comprises logic configured to set the state entry of the access control module, the state entry enabling the application module to access the user-owned resource for the extended duration of access.

18. The access system of claim 17, further comprising logic for revoking the extended duration of access in response to an instruction from a user.

19. The access system of claim 16, wherein the access action module comprises a discrete access action module which comprises:

logic configured to issue a pull upcall to a source entity, requesting the source entity to provide data; and logic configured to issue a push upcall to a destination entity, requesting the destination entity to accept the data that is provided by the source entity, wherein either the source entity or the destination entity is the user-owned resource.

20. The access system of claim 15, wherein the operating system further comprises:

a gesture recognition module operable to detect gesture input via using an input mechanism, wherein the access action module is operable to respond to detection of the gesture input by providing the application module with access to a user-owned resource that is associated with the gesture input.

* * * * *